US012778342B2

(12) United States Patent
Bentley et al.

(10) Patent No.: US 12,778,342 B2
(45) Date of Patent: Nov. 3, 2026

(54) COOKING PROGRAM DEVELOPMENT SYSTEM

(71) Applicants: BSH Home Appliances Corporation, Irvine, CA (US); BSH Hausgeräte GmbH, Munich (DE)

(72) Inventors: Garrett Bentley, Knoxville, TN (US); Luc Lam, Irvine, CA (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 970 days.

(21) Appl. No.: 18/075,481

(22) Filed: Dec. 6, 2022

(65) Prior Publication Data

US 2024/0180362 A1 Jun. 6, 2024

(51) Int. Cl.
*A47J 36/32* (2006.01)

(52) U.S. Cl.
CPC .................................. *A47J 36/321* (2018.08)

(58) Field of Classification Search
CPC .............. G05B 19/042; G05B 22/2643; G05B 19/0426; A47J 36/32
See application file for complete search history.

(56) References Cited

U.S. PATENT DOCUMENTS

| | | | | |
|---|---|---|---|---|
| 9,740,998 | B2 | 8/2017 | Cartwright | |
| 10,024,544 | B2 | 7/2018 | Bhogal | |
| 10,162,481 | B2 | 12/2018 | Robberechts | |
| 10,708,409 | B2 | 7/2020 | Colston | |
| 11,064,579 | B2 | 7/2021 | Banavara | |
| 11,132,918 | B2 | 9/2021 | Young | |
| 2013/0092032 | A1* | 4/2013 | Cafferty | F24C 7/08 99/325 |
| 2014/0295822 | A1* | 10/2014 | Koo | H05B 1/02 455/420 |
| 2015/0064314 | A1* | 3/2015 | Manuel | A23L 5/10 707/731 |
| 2015/0074237 | A1* | 3/2015 | Unagami | H05B 6/6435 709/219 |
| 2017/0139385 | A1* | 5/2017 | Young | A47J 27/04 |
| 2019/0053332 | A1 | 2/2019 | Cheng | |
| 2021/0176834 | A1* | 6/2021 | Eilerts | F24C 7/082 |

FOREIGN PATENT DOCUMENTS

WO 2016138828 A1 9/2016

* cited by examiner

*Primary Examiner* — Kidest Worku
(74) *Attorney, Agent, or Firm* — Michael E. Tschupp; Andre Pallapies; Brandon G. Braun

(57) ABSTRACT

A cooking program development system may include a cooking program developer tool configured to facilitate the creation of automated cooking programs, a cooking program feedback tool configured to facilitate utilizing user feedback to modify and improve the automated cooking programs, and a cooking program marketplace configured to facilitate the sharing of the automated cooking programs with a plurality of users. The cooking programs created utilizing the cooking program developer tool are configured to be utilized by a specific cooking appliance to cook a specific food item according to a user's personal preferences. The cooking programs may include instructions for the cooking appliance to automatically determine one or more cooking parameters to utilize to cook the food item based on characteristics of the food item sensed by one or more sensors of the cooking appliance.

20 Claims, 16 Drawing Sheets

202

204

PROGRAMS

+ CREATE NEW PROGRAM

DASHBOARD ▶ PROGRAMS

| PROGRAM TITLE | INTERNAL TITLE | CATEGORY | CAVITIES | CURRENT VERSION | PROGRAM ID | RATINGS CONSUMER | RATINGS INTERNAL | REVIEWS | PUBLISHED | ACTIONS |
|---|---|---|---|---|---|---|---|---|---|---|
| STUFFED CHICKEN BREAST | STUFFED CHICKEN | POULTRY | BOSCH 30" | V2 | PR001 | VERY SATISFIED | 4/5 | 12 | YES | EDIT, SAVE, DOWNLOAD |
| RIB ROAST | STANDING RIB ROAST | MEAT | THERMADOR 30" BOSCH 30" | V2 | PR002 | VERY SATISFIED | 4/5 | 12 | NO | EDIT, SAVE, DOWNLOAD |
| STEAK | STEAK MEAT | MEAT | BOSCH 30" | V1 | PR003 | VERY SATISFIED | 3/5 | 12 | YES | EDIT, SAVE, DOWNLOAD |
| FISH | FISH | FISH | THERMADOR 30" | V1 | PR004 | VERY SATISFIED | 2/5 | 12 | NO | EDIT, SAVE, DOWNLOAD |
| LEMON CHICKEN | LEMON CHICKEN | POULTRY | THERMADOR 30" | V1 | PR005 | VERY SATISFIED | 3/5 | 12 | YES | EDIT, SAVE, DOWNLOAD |
| ROASTED POTATOES | POTATOES | VEGETABLES | THERMADOR 30" | V1 | PR006 | VERY SATISFIED | 1/5 | 12 | YES | EDIT, SAVE, DOWNLOAD |

FIG. 2

COOKING PROGRAM DEVELOPMENT SYSTEM

FIELD

This disclosure relates to systems and methods for automated cooking programs. More specifically, the disclosed embodiments relate to creating automated cooking programs.

INTRODUCTION

Many cooking appliances are capable of utilizing automated cooking programs to cook meals and food items. Automated cooking programs ease the cooking process for the user of the cooking appliance by providing cooking temperatures, modes, and cooking times for specific meals and food items. While cooking programs ease the cooking process for the user, some users of cooking appliances still prefer to manually cook food items because many automatic cooking programs are generic and do not consider the user's personal preferences.

SUMMARY

The present disclosure provides systems, apparatuses, and methods relating to cooking program development systems.

In some embodiments, a computer-implemented method for developing automatic cooking programs includes: displaying, on a user interface (UI) of an electronic device, a cooking program creation form including a plurality of information fields, each field configured to receive a specific type of information relating to an automatic cooking program; receiving, in the cooking program creation form via the UI, a selection of a cooking appliance type and a food item type for the automatic cooking program; automatically providing information in a first one or more of the information fields of the cooking program creation form, based on the selected cooking appliance type and the selected food item type; receiving, via the UI, user-provided information in a second one or more of the information fields of the cooking program creation form; creating a new automatic cooking program based on the information in the first and second information fields of the cooking program creation form; communicating the automatic cooking program to a cooking appliance of the cooking appliance type, wherein the cooking appliance is configured to automatically execute the cooking program to cook a food item of the food item type; and storing the automatic cooking program in a memory of the electronic device.

In some embodiments, a system for developing automated cooking programs, the system includes: a personal electronic device in communication with a cooking appliance, the personal electronic device including a first user interface (UI) and first processing logic configured to: automatically generate, based on a type of the cooking appliance, a cooking program creation form including a plurality of information fields, wherein each information field is configured to receive a specific type of information relating to an automatic cooking program configured to be executed by a cooking appliance of the selected cooking appliance type to cook a food item of a selected food item type; display, on the first UI, the cooking program creation form including the plurality of information fields; receive information in one or more of the information fields of the cooking program creation form to create the automatic cooking program; and communicate the automatic cooking program to the cooking appliance; wherein the cooking appliance includes a sensor, a second UI, and an electronic controller including second processing logic configured to automatically execute the instructions of the automatic cooking program to cook a food item.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2 is an illustrative cooking program selection interface of a cooking program development application in accordance with aspects of the present disclosure.

DETAILED DESCRIPTION

Figure 1:
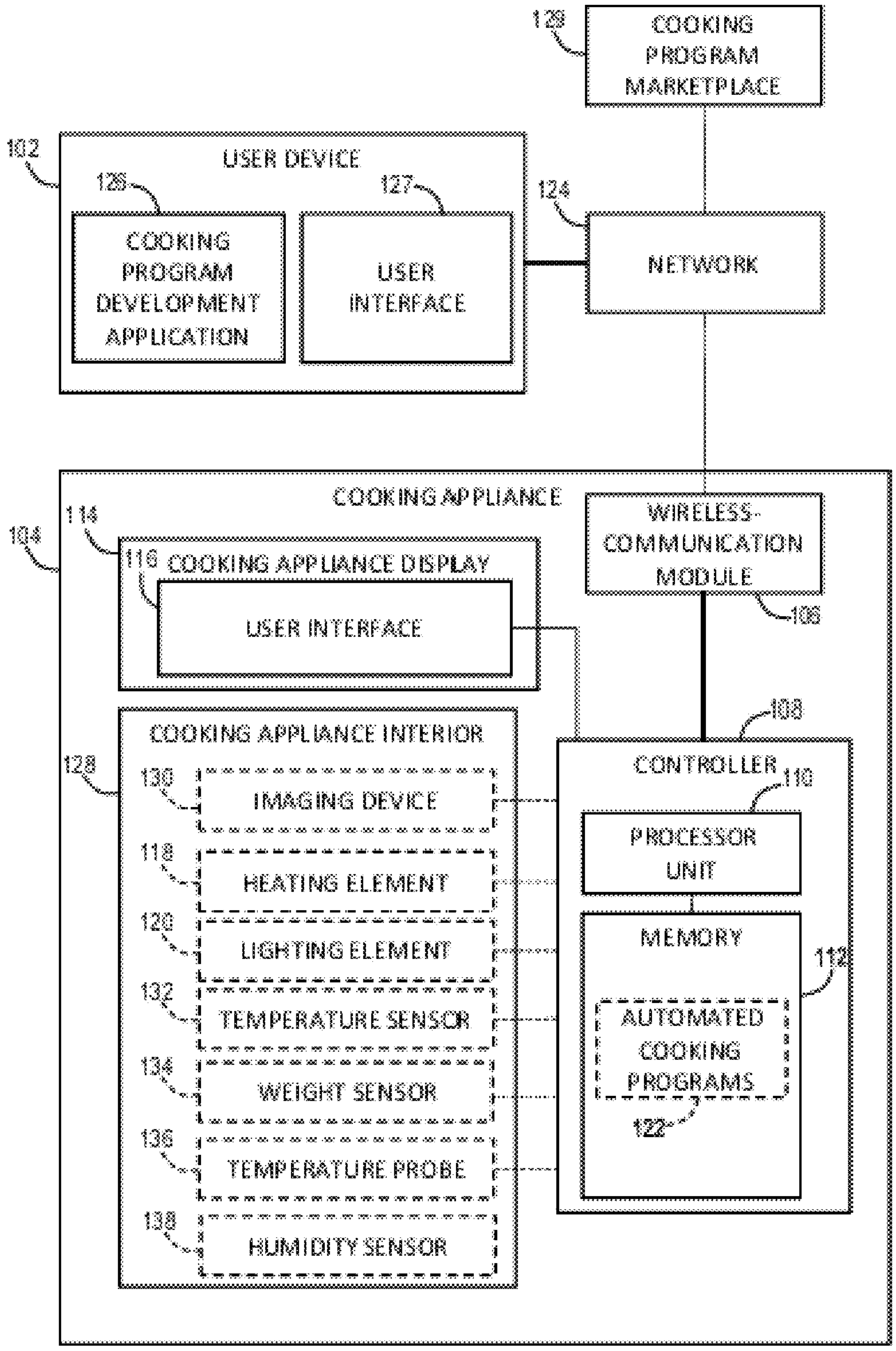
FIG. 1 is a schematic diagram of an illustrative cooking program development system in accordance with aspects of the present disclosure.

Various aspects and examples of a cooking program development system are described below and illustrated in the associated drawings. Unless otherwise specified, a cooking program development system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, cooking program development systems in accordance with the present teachings facilitate the development and modification of complex automated cooking programs to be utilized by cooking appliances to automatically or semiautomatically cook a food item or meal. The system includes an interactive cooking program creation interface (e.g., a form) configured to guide a user through the process of creating an automated cooking program for a specific food item and a specific cooking appliance. In some examples, the system utilizes feedback regarding the performance of the cooking program to modify the cooking program. In some examples, the system facilitates the creation of complex cooking programs and the use of user feedback to modify and improve the performance of the complex cooking programs.

The system includes a cooking program developer tool configured to facilitate the creation of the cooking programs, a cooking program feedback tool configured to facilitate the use of feedback to modify and improve the cooking programs, and a cooking program marketplace configured to facilitate the sharing of the created cooking programs with a plurality of users. By sharing the cooking programs with many different users having different food preferences and providing the many different users with the ability to modify and create the shared cooking programs, the program development system facilitates the rapid creation and improvement of cooking programs for many different food items and many different food item preferences.

In some examples, the cooking program developer tool, the cooking program feedback tool, and the cooking program marketplace are accessible by the user via one or more software programs stored on the user's mobile device, computer, cooking appliance, and/or any other suitable device. The user may interact with the program including the developer tool, feedback tool, and/or program marketplace via a user interface of the user's mobile device, on the cooking appliance, on a computer, via an external connected device (e.g., home hub), and/or any other suitable device.

The cooking program developer tool includes an interactive cooking program creation form configured to guide the user through a process of creating an automatic cooking program (AKA cooking program card) configured to be utilized by a specific cooking appliance to cook a specific food item. The cooking programs include information relating to the food item and the cooking appliance and instructions configured to be executed by the cooking appliance to cook the food item or meal. The cooking programs may be created to cook any type of food item such as meat, vegetables, baked goods, etc. and to result in various different finished outcomes for the food items. The cooking programs are configured to be executed by the controller of any suitable cooking appliance, such as any variation of oven (e.g., thermal, convection, toaster oven, microwave oven, combination ovens, etc.), stovetop, grill, all-in-one cooker, smoker, and/or any other suitable appliance.

The cooking program developer tool is configured to receive information from a user and/or automatically determine information to create the automatic cooking programs. The information included in the cooking programs may include characteristics of the food item or meal (e.g., type of food, weight, quantity, thickness, etc.), the cooking appliance type, specific cooking parameters (e.g., cooking temperature, cooking mode, cooking duration, different steps in the cooking process etc.), the user's finished outcome preference for the food item (e.g., the program is for steak and the finished preference is well-done), trigger events during the cooking process, instructions to be displayed to the user during the cooking process, one or more images of the food item, and/or any other suitable information necessary to create the cooking program. The cooking program creation form has a plurality of different information fields configured to guide the user in providing the relevant information. The cooking program creation form may be displayed on the user interface of the user's mobile device, computer, cooking appliance, and/or any other suitable device, such that the user can view and input information into the form.

Each information field of the cooking program creation form is configured to receive a specific type of information and includes a label indicating the specific type of information the information field is configured to receive. In some examples, the information fields are grouped into categories or sections of the cooking program creation form. For example, the cooking program creation form may include a section for general program information (e.g., program name, food item category, appliance type, etc.), base food item parameters (e.g., baseline weight, quantity, thickness, volume of the food item the cooking program is intended to cook), oven operation information (e.g., steps of the cooking process including oven modes, oven temperatures, cooking duration of each step), user instructions (e.g., instructions to be displayed to the user to direct the user through the cooking process), time alerts (e.g., alerts to be sent to a user during the cooking process to prompt the user to take a specified action), etc. Each section of the cooking program creation form may include one or more information fields corresponding to the section.

In some examples, one or more information fields of the cooking program creation form include text fields configured to receive text-based information. For example, one or more information fields may be configured to receive written user instructions, and/or written alert messages to be sent to the user during the cooking process. In some examples, information fields of the cooking program creation form include drop down menus having one or more options for a user to select from to provide the information in the field. For example, the cooking program creation form may include a drop-down menu providing options of different intended finished outcomes of the food item for a user to select from, such as rare, medium rare, medium, medium well, well-done, etc.

In some examples, the program developer tool automatically determines the information fields to include in the cooking program creation form and the options to include in the drop-down menus of the information fields based on a category of the food item for the cooking program. For example, if the food item category of the cooking program is cookies, the developer tool may automatically provide in the cooking program creation form a drop-down menu including different possible finished outcomes for the cookies, such as chewy, normal, crunchy, golden brown, etc. In another example, if the food item category of the cooking program is steak, the developer tool may automatically provide in the cooking program creation form a drop-down menu including the possible finished outcome options of rare, medium rare, medium, medium well, well-done, etc.

In some examples, the type and number of information fields included in the cooking program creation form is determined by the developer tool based on the capabilities of the specific cooking appliance to be utilized to execute the cooking program. For example, the developer tool may have information indicating the different cooking modes offered by the user's specific cooking appliance and provide in a drop-down menu the cooking modes offered by the specific cooking appliance. Providing the information fields based on the capabilities of the cooking appliance facilitates informing the user of all the different capabilities of the user's cooking appliance.

The cooking program creation form may include one or more buttons configured to be selected by a user to cause one or more additional information fields to appear in the cooking program creation form and be displayed on the user interface. For example, the cooking program creation form may include an "Add a step" button configured to create a new cooking step in the cooking program and add one or more information fields to the cooking program creation form. In some examples, adding a step includes adding an information field configured to receive a cooking temperature or heating level for the cooking step, and an information field configured to receive a cooking appliance operating mode for the cooking step. In some examples, the cooking program creation form includes a "Set a new alert" button, an "Add a new user instruction" button, a "create program" button, and/or any other suitable buttons.

In some examples, certain information of the cooking program creation form is automatically determined and input into the cooking program creation form by the cooking program developer tool. For example, the user may input information relating to characteristics of the food item, the cooking appliance, and the user's finished preference for the food item. Using this information, the cooking program developer tool may automatically determine the cooking parameters for the cooking program based on the input information. The cooking program developer tool may automatically determine the information utilizing previously existing cooking programs, trained machine learning models, formulas, algorithms, and/or using any other suitable method. In some examples, the cooking program developer tool is configured to automatically determine invalid user inputs. For example, the cooking program developer tool may not allow a user to input a cooking temperature above a maximum allowable cooking temperature for the cooking appliance of the cooking program.

After a user and/or the developer tool inputs information in each of the information fields of the cooking program creation form, the user may select a "create" button to create a new cooking program based on the information input into the creation form. The new cooking program includes the information and instructions provided in the cooking program creation form by the user and/or by the developer tool. The new cooking program may be stored in a memory of the user's mobile device, in a connected system (e.g., the cloud), and/or the new cooking program may be communicated to the cooking appliance and stored in a memory of the cooking appliance. The instructions of the new cooking program are executable by an electronic controller of the cooking appliance to cook the food item according to the cooking program.

The cooking program developer tool facilitates the modification of existing cooking programs to account for different finished outcomes of the food item, different cooking appliances, different quantities, or sizes of the food item, and/or for any other suitable reason. The cooking program developer tool facilitates the creation of a cooking program family including a plurality of associated cooking programs each configured to cook a same food item. In some examples, the cooking program family includes a parent cooking program and one or more child cooking programs created based on the parent cooking program. In some examples, the child cooking program is based on the parent cooking program but includes one of more modifications of information in the cooking program creation form of the parent cooking program. The child cooking programs may be modified to result in a different finished outcome of the food item than the parent cooking program, to utilize a different cooking appliance, to result in a faster or slower cooking time, and/or in any other suitable manner according to the user's preferences. For example, the parent cooking program may be configured to cook steak using a regular oven and the child cooking program may be configured to cook steak using a grill. In another example, the parent cooking program may be configured to cook a steak rare, and the child cooking program may be configured to cook a steak well-done.

In some examples, in response to receiving a request to create a child cooking program based on an existing parent cooking program, the cooking program developer tool makes a copy of the parent cooking program creation form and prompts the user to modify the information of the parent cooking program creation form according to the user's preferences. In some examples, the cooking program developer tool automatically modifies the parent cooking program based on a user request to create a specific child cooking program. For example, the parent cooking program may be configured to cook a steak utilizing a regular oven, and the user wishes to create a child cooking program to cook the steak using a convection oven. The cooking program developer tool may have one or more algorithms indicating that cooking times for a convection oven are typically 10% less than for a regular oven. Based on the users request to create a child cooking program for a convection oven and the one or more algorithms, the cooking program developer tool may automatically change or suggest to the user a new cooking time for the child cooking program that is 10% less than the cooking time for the parent cooking program.

The automated cooking programs created by the developer tool include instructions configured to be executed by an electronic controller of the cooking appliance to cook the food item. The instructions of the cooking program may include cooking operation information, trigger events, user instructions, and/or any other suitable information the cooking appliance and/or the user of the cooking appliance may need to perform the cooking program. The cooking operation information may include cooking mode, cooking temperature, cooking duration, etc. In some examples, the instructions of the cooking program include multiple cooking steps, such that the cooking appliance is instructed to transition between different cooking modes and/or different cooking temperatures throughout the cooking process. For example, a cooking program may include a first step in which the cooking appliance is instructed to cook the food item in a broil operating mode at 350 F for 8 minutes and a second cooking step in which the cooking appliance is instructed to cook the food item utilizing a roast operating mode at 400 F for 20 minutes.

In some examples, the instructions of the cooking program include trigger events configured to indicate to the cooking appliance when to transition between the different cooking steps of the cooking program, and/or alert a user to take a specified action. In some examples, the cooking programs are sensor based such that the cooking appliance utilizes a temperature probe, and/or any other suitable sensor to determine when to transition between the different cooking steps of the cooking program. For example, the cooking program may include instructions directing the cooking appliance to transition between a first and a second cooking mode in response to detecting, by a temperature probe of the cooking appliance, an internal temperature of the food item of 125 F. In some examples, the cooking program includes instructions for the cooking appliance to transition between a first and a second cooking mode in response to a detected brownness level of the food item reaching a threshold level. In some examples, the cooking programs are time based, such that the instructions of the cooking program direct the cooking appliance to transition between different cooking steps of the cooking program after a certain amount of time has elapsed.

In some examples, the cooking programs include instructions for the cooking appliance to automatically determine one or more cooking parameters of the cooking program based on sensed characteristics of the food item or meal. For example, the cooking program may include instructions indicating that for every additional pound of weight the food item weighs the cooking time should increase by 3 minutes. The cooking program may include instructions for the cooking appliance to vary cooking times based on detected thickness of the food item, quantity of the food item, and/or based on any other suitable characteristic of the food item. In some examples, the cooking appliance includes one or more sensors configured to detect the characteristic of the food item and processing logic of the cooking appliance automatically determines the correct cooking time based on the instructions and the sensed characteristic of the food item. Utilizing sensed characteristics of the food item to automatically determine one or more cooking parameters of the cooking program facilitates the cooking program automatically adapting to the specific conditions present each time the cooking program is executed, without requiring a user to modify the cooking program to account for the conditions.

Each cooking program may be configured to cook the food item or meal to have a specific finished outcome. For example, the cooking program may be configured to cook a steak to be medium rare. The finished outcomes may be based on a brownness level of the food item, a doneness level of the food item, a desired texture of the food item, and/or any other suitable characteristic of the food item. Different variations of a cooking program may be created to result in different finished outcomes of a food item. The different variations of the cooking program may have one or more different cooking parameters, such that each variation results in a different finished outcome of the food item.

The cooking program developer tool is configured to communicate the cooking program cards to the cooking appliance to be executed to cook the food item or meal. In some examples, the cooking program developer tool communicates the cooking program including the instructions to the cooking appliance in response to a user request to start a specific cooking program to cook a food item or meal. The user may request to use a cooking program via the user's mobile device, computer, and/or the cooking appliance. The cooking program developer tool may communicate the cooking program card to the cooking appliance wirelessly via a local network, and/or by any suitable method.

The cooking program development system may include the cooking appliance. The cooking appliance may be any suitable cooking appliance configured to receive and execute the automatic cooking programs created by the cooking program developer tool. In some examples, the cooking appliance includes an electronic controller having processing logic configured to execute the instructions of the cooking programs created using the cooking program developer tool. In some examples, the cooking appliance includes a wireless-communication module configured to receive, from the cooking program developer tool, the automatic cooking programs. The controller of the cooking appliance having the processing logic is connected to and configured to control various components of the cooking appliance to execute the instructions of the received cooking programs. The components of the cooking appliance may include various heating elements, fans, lighting elements, and/or various sensors.

The cooking appliance may include a camera, a temperature sensor, a temperature probe, a weight scale, a humidity sensor, and/or any other suitable sensors configured to detect characteristics of the food item or a characteristic of the cooking appliance itself. In some examples, the cooking appliance includes a camera configured to image the food item and determine a brownness level of the food item. In some examples, the images taken by the camera are used to identify the food item utilizing machine learning. In some examples, the oven includes a temperature sensor, and/or a temperature probe. The temperature sensor may be configured to detect a temperature of air within a cavity of the cooking appliance, a temperature of a wall of the cooking appliance, and/or a temperature of a food item in the cooking appliance. In some examples, the temperature probe is configured to be inserted into the food item to detect an internal temperature of the food item.

The cooking program development system includes a cooking program feedback tool. The cooking program feedback tool is configured to facilitate the use of feedback regarding the performance of the cooking program to determine modifications to make to the cooking program to improve the performance of the program. Feedback may include feedback from the user and/or sensor data collected by the cooking appliance throughout the cooking process. In some examples, the feedback tool prompts the user to input feedback regarding the performance of the cooking program after receiving an indication of a completion of an execution of the cooking program. The feedback tool may prompt the user in response to receiving, from the cooking appliance, an indication of a termination of the cooking program. In some examples, the feedback tool requests the user feedback by displaying a message on a user's mobile device, the user's cooking appliance, and/or in any other suitable way.

The feedback tool may request from the user categorical feedback (e.g., satisfied, unsatisfied, etc.), rating-based feedback (e.g., 1/5, 3/5, 4/5, etc.), and/or text-based feedback such as a written description. In some examples, the feedback tool prompts the user to provide feedback indicating whether an actual finished outcome of the food item cooked using the cooking program matched an expected finished outcome of the food item cooked using the cooking program. Additionally or alternatively, the feedback may include sensor data collected by the cooking appliance throughout the cooking process. The sensor data may include brownness levels of the food item at different times during the cooking process, volume of the food item at different times during the cooking process, internal temperature of the food item at different times during the cooking process, and/or any other suitable data collected by the sensors of the cooking appliance throughout the cooking process.

In some examples, the feedback received by the cooking program feedback tool is analyzed by the cooking program developer tool to determine modifications to make to the cooking program to improve the cooking program. In some examples, the program developer tool performs the analysis automatically using analytics software, machine learning models, and/or by any other suitable method. In some examples, the analysis of the feedback is performed manually by a user. The feedback may be analyzed after each execution of the cooking program or after the cooking program has been executed a certain number of times and a certain amount of feedback has been received.

In some examples, the cooking program developer tool prompts the user to modify the cooking program based on the analysis of the received feedback. For example, in response to receiving feedback from the user indicating that the actual finished outcome of the cooking program does not match the expected finished outcome, the system may prompt the user to modify one or more cooking parameters of the cooking program in the cooking program creation form. In some examples, the system automatically modifies one or more cooking parameters of the cooking program based on the received feedback, and/or based on the cooking appliance sensor data. For example, the system may receive feedback indicating the food item was overcooked and automatically reduce the cooking time, and/or reduce the cooking temperature of the cooking program. In some examples, the system utilizes trained machine learning models, algorithms, formulas, and/or other existing cooking programs to determine the correct cooking parameter modifications to make to the cooking program in response to the feedback. In some examples, if the user provides feedback indicating the actual finished result of the cooking program matches the expected finished result, the developer tool determines no modification of the cooking program is necessary. In some examples, the cooking program developer tool modifies the cooking program or requests modification of the cooking program after a specific amount of feedback is received indicating unsatisfactory performance of the cooking program.

In some examples, the cooking program developer tool modifies other cooking programs in a cooking program family based on the modification of the program that received the feedback. For example, the developer tool receives feedback indicating a parent cooking program over baked cookies to be dark brown when the cookies were meant to be baked to be light brown. It may be expected that a child cooking program created based on the parent program will also over bake the cookies. Thus, the system may prompt the user to update the child program to reduce the cooking time and/or reduce the cooking temperature of both the parent and child cooking programs. In some examples, the developer tool automatically updates one or more of the other cooking programs in the cooking program family based on the received feedback utilizing formulas, algorithms, or utilizing trained machine learning models. Modifying associated cooking programs facilitates the rapid modification and improvement of the entire cooking program family without requiring testing of each cooking program in the family individually.

The cooking program development system may include a cooking program marketplace. Cooking programs created using the cooking program developer tool may be uploaded and shared in the cooking program marketplace. Users of the cooking program marketplace may use, modify, rate, and/or share the cooking programs that are uploaded to the marketplace. Users are able to select existing cooking programs created by other users and adapt them to their specific finished preferences for food items or the cooking appliances available to each individual user. By sharing the cooking programs with many different users, the cooking program marketplace facilitates the rapid development of many different cooking programs configured to cook many different food items utilizing many different cooking appliances.

The system may be used by internal users, end users, and/or any other suitable user of cooking appliances to develop automated cooking programs. Internal users may include employees of an organization that creates and shares cooking programs to be utilized by end users that buy and own the cooking appliances. In some examples, the cooking program developer tool, and feedback tool are utilized by the internal users to create, test, and modify a plurality of cooking programs in a cooking program family. The internal user may complete several cycles of testing including executing the cooking programs using a cooking appliance, providing feedback based on the performance of the programs, and modifying the programs to improve the performance. After the internal user is satisfied with the performance of the cooking programs in the cooking program family, the internal user may share the cooking program in the cooking program marketplace. The cooking program marketplace allows end users access to the cooking programs of the cooking program family created and tested by the internal user. In some examples, the end users may utilize the cooking programs created by the internal user and provide feedback to the internal user regarding the performance of the cooking program. In some examples, the internal user receives the end user feedback and modifies the cooking programs based on the end user feedback. In some examples, the end users utilize the cooking program developer tool to make modifications to the cooking programs according to the end user's personal preferences. In some examples, the programs modified by the end users are also shared in the cooking program marketplace. In this way, the cooking program development system facilitates rapid creation and improvement of many different cooking programs configured to cook many different food items according to many different user preferences.

Technical solutions are disclosed herein for the development of automated cooking programs. Specifically, the disclosed system/method addresses a technical problem tied to cooking appliance technology and arising in the realm of automated cooking programs for the cooking appliances, namely the technical problem of rapidly developing complex automated cooking programs that cook food items and meals according to a user's preferences. The system and method disclosed herein provides an improved solution to this technical problem by involving many users having different preferences in the cooking program creation and modification process and having automatic features such that the user does not need to account for all variables of the cooking program.

The disclosed systems and methods provide an integrated practical application of the principles discussed herein. Specifically, the disclosed systems and methods implements the solution with or uses a particular machine or manufacture that is integral to the invention (i.e., cooking appliances). Accordingly, the disclosed systems and methods apply (or use) the relevant principles in a meaningfully limited way.

Aspects of the cooking program development system may be embodied as a computer method, computer system, or computer program product. Accordingly, aspects of the cooking program development system may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the cooking program development system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the cooking program development system may be written in one or any combination of programming languages, including an object-oriented programming language (such as Java, C++), conventional procedural programming languages (such as C), and functional programming languages (such as Haskell). Mobile apps may be developed using any suitable language, including those previously mentioned, as well as Objective-C, Swift, C #, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the cooking program development system may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the cooking program development system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of illustrative cooking program development systems as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Cooking Program Development System

As shown in FIG. 1, this section describes an illustrative cooking program development system 100. Cooking program development system 100 is an example of cooking program development systems, described above.

Cooking program development system 100 includes at least one user device 102 and at least one cooking appliance 104. Cooking appliance 104 includes a wireless communication module 106 configured to communicate with user device 102 via a local area network, and/or any other suitable method. Communication module 106 is coupled to an electronic controller 108 having a processor unit 110 and a memory 112. Controller 108 is configured to control operations of cooking appliance 104. Cooking appliance 104 may comprise a conventional oven, a convection oven, a toaster oven, a stovetop, a grill, and/or any other suitable appliance configured to cook a food item.

Cooking appliance 104 includes a cooking appliance display 114 configured to display information to a user of the cooking appliance. Cooking appliance display 114 includes a user interface 116 having a variety of control features configured to communicate with controller 108 to regulate operation of cooking appliance 104. The control features of user interface 116 may include one or more control knobs, buttons, switches, screens, and/or touch pads. User interface 116 facilitates the user setting and adjusting cooking mode, cooking temperature, and cooking timers of the cooking appliance. In some examples, user interface 132 allows the user to view and select cooking programs, and/or adjust cooking parameters or variables of cooking programs.

Cooking appliance controller 108 is configured to control operation of cooking appliance 104. Controller 108 is operatively coupled to one or more sensors, a heating element 118, and a lighting element 120 of the oven to control operation of the components of the cooking appliance. In some examples, controller 108 is configured to receive from user interface 116 instructions, such as a user's selection of cooking modes, cooking temperatures, and/or cooking programs. Controller 108 includes processer unit 110 having processing logic configured to process the received instructions to control operation of the components of the cooking appliance such as heating element 118, lighting element 120, and various sensors of the appliance.

Controller 108 includes memory 112. Memory is configured to store information relating to operation of the cooking appliance and/or automated cooking programs 122. Automated cooking programs 122 include instructions configured to be executed by controller 108 to cook specific food items. Memory may also store information including sensor data from previously executed cooking programs.

The user device may include a user interface 127 and a cooking program development application 126. Cooking program development application may include the cooking program developer tool and cooking program feedback tool, described above. The cooking program creation form of the cooking program developer tool may be displayed on user interface 127 of user device 102. A user of user device 102 may interact with cooking program development application 126 using user interface 127 to create automated cooking programs to be utilized by cooking appliance 104.

Wireless-communication module 106 is coupled to controller 108. Wireless-communication module 106 comprises hardware configured to connect to a network 124, and/or a user device 102. In some examples, cooking appliance 104 utilizes wireless communication module 106 to receive automated cooking programs and/or other information from user device 102 and cooking program development application 126 via network 124. In some examples, cooking appliance 104 utilizes wireless communication module 106 to request and receive automated cooking programs from a cooking program marketplace 129 via network 124. Controller 108 is coupled to communication module 106, such that controller 108 receives the instructions of the automated cooking programs. Processor unit 110 of controller 108 utilizes processing logic to process the instructions of the automated cooking programs and control the components of the cooking appliance according to the instructions.

Cooking appliance 104 further includes a cooking appliance interior 128. Cooking appliance interior 128 may include an imaging device 130 such as a camera. Imaging device 130 may be configured to image an interior of the cooking appliance and image food items in the interior of the cooking appliance. In some examples, images of the food items in the interior of the cooking appliance are utilized to identify the food item, and/or determine one or more characteristics of the food item, such as a brownness level or volume of the food item.

Cooking appliance interior 128 includes heating element 118 and lighting element 120. Heating element 118 may be controlled by controller 108 of the cooking appliance and configured to heat the interior of the cooking appliance. Lighting element 120 may be controlled by controller 108 and configured to provide lighting within the cooking appliance interior. Lighting provided by lighting element 120 may facilitate determining changes in brownness level or other conditions of the food item imaged by imaging device 116.

Cooking appliance interior 128 may include one or more sensors configured to detect characteristics of a food item in the cooking appliance, and/or conditions of cooking appliance 104 itself. Sensors included in cooking appliance interior 128 may include one or more temperature sensors 132, a weight sensor 134, a temperature probe 136, a humidity sensor 138, and/or any other suitable sensor configured to detect characteristics of a food item or cooking appliance 104 itself. Temperature sensor 132 may include one or more sensors configured to detect a temperature of air in cooking appliance interior 138, and/or a temperature of a portion of the cooking appliance itself. Weight sensor 134 may include any suitable sensor configured to sense a weight of food items in the cooking appliance interior. In some examples, weight sensor 134 is disposed exterior of the cooking appliance. Temperature probe 136 may include any suitable sensor configured to determine an internal temperature of the food item to be cooked.

B. Illustrative Cooking Program Developer Tool Interface

As shown in FIGS. 2-7, this section describes an illustrative user interface 200 of an illustrative cooking program developer tool 202. Cooking program developer tool 202 is an example of cooking program developer tools, described above.

As shown in FIG. 2, cooking program developer tool 202 includes a program dashboard interface 204. Program dashboard 204 displays cooking programs previously created, modified, and/or utilized by the user and information about the cooking programs. The information may include the program title, food type category, cavities (AKA cooking appliances), current version of the cooking program, a program ID number, program ratings based on reviews of the program, the number of reviews of the program, indication of whether the program is published to the cooking program marketplace, and a list of actions a user can initiate to utilize or edit the cooking programs.

Program dashboard 204 facilitates a user browsing cooking programs the user has previously created or utilized, and the user viewing new cooking programs other users have created. A user may select any of the cooking programs displayed on the cooking program dashboard to view more information about the program, to modify the program, and/or to utilize the program to cook a food item. As shown in FIG. 2, program dashboard 204 also includes an option for the user to select to create a new cooking program.

Figure 3:
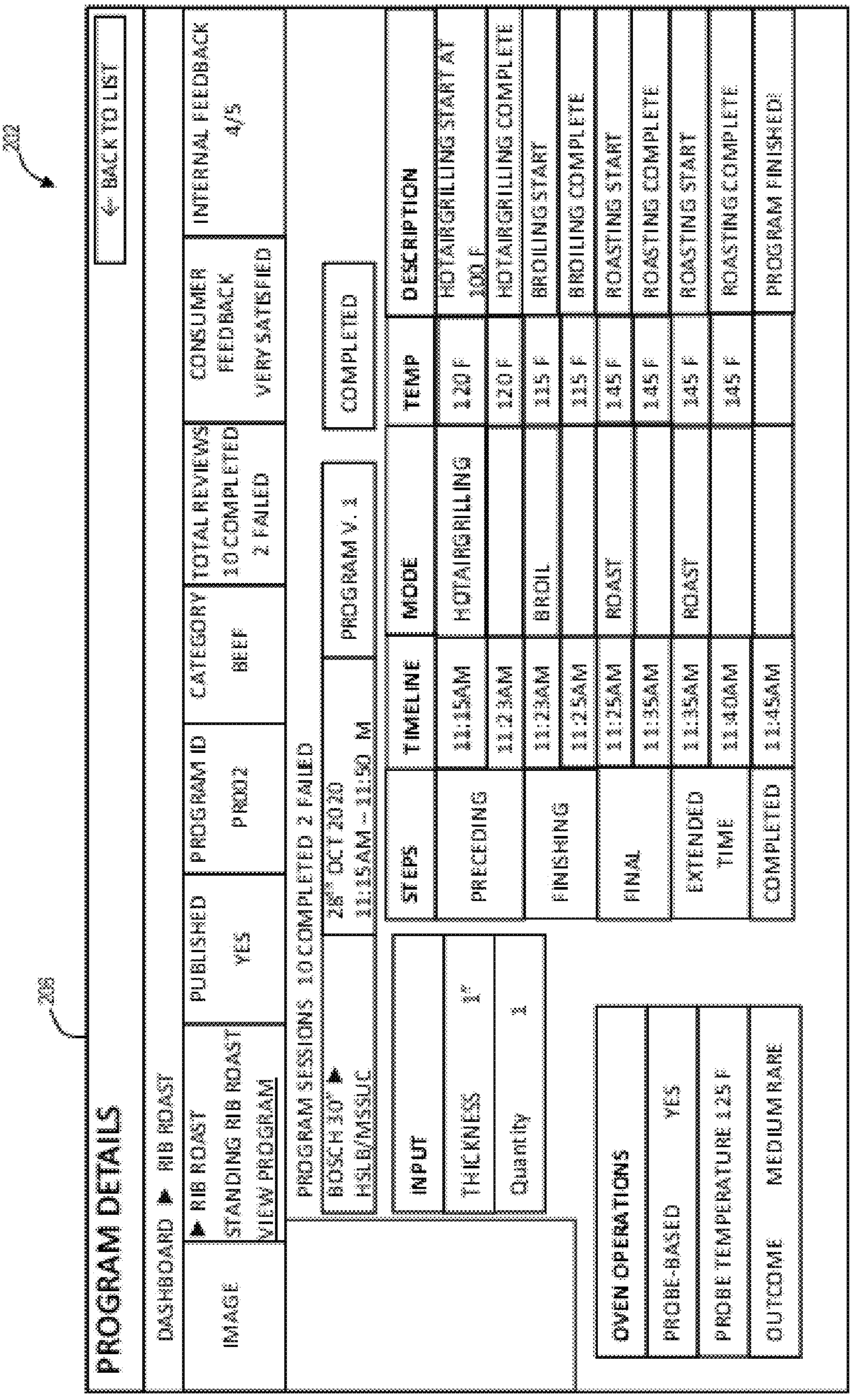
FIG. 3 is an illustrative cooking program information interface of a cooking program development application in accordance with aspects of the present disclosure.

FIG. 3 depicts a cooking program general information interface 206 of cooking program developer tool 202. After the user selects a program from program dashboard page 204, cooking program developer tool 200 may display general information page 206 for the specific program. General information page 206 includes more information about the specific cooking program including specific cooking parameters of the cooking program.

Figure 4:
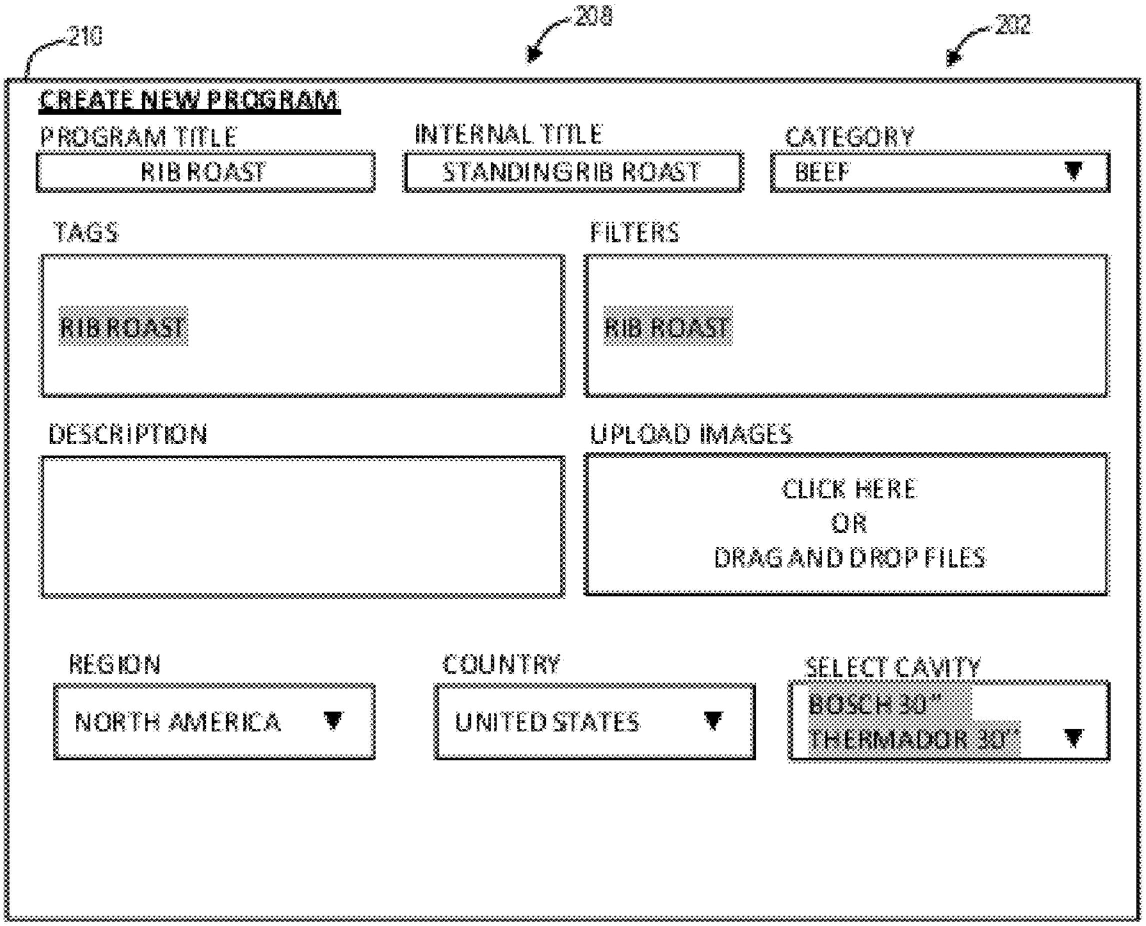
FIG. 4 is an illustrative cooking program creation form interface of a cooking program development application in accordance with aspects of the present disclosure.

FIGS. 4-7 depict portions of a cooking program creation form interface 208. Cooking program developer tool 202 may display cooking program creation form 208 after a user selects create a new program on dashboard page 204. FIG. 4 depicts a general information page 210 of program creation form 208. General information page 210 includes a plurality of information fields for a user to populate with information corresponding to the particular cooking program the user wishes to create. Information fields included in general information page 210 include a program title, category of food item to be cooked, a description of the program, an information field to upload images of food items cooked using the program, a region of the world the program was created in, etc.

Figure 5:
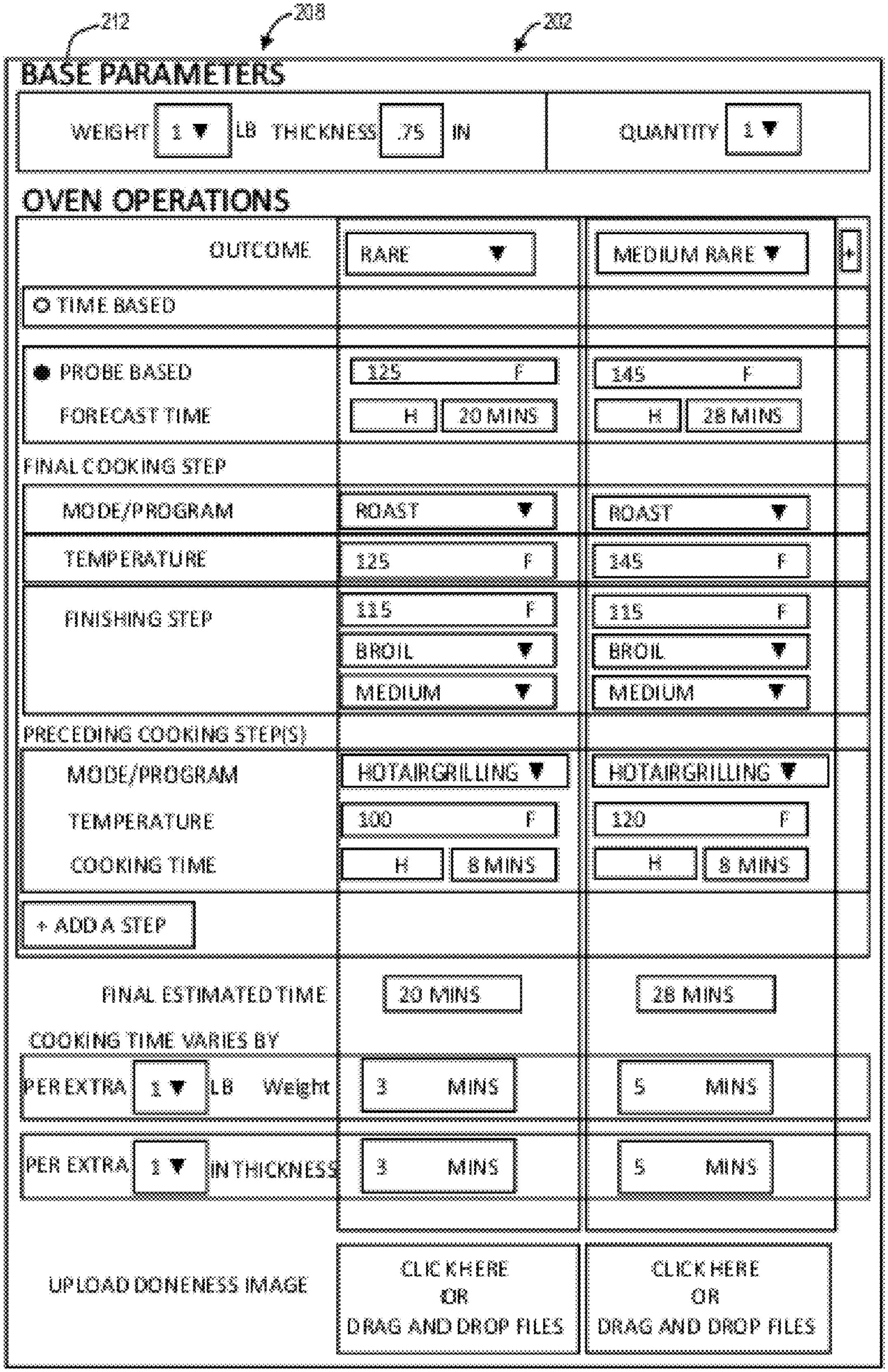
FIG. 5 is an illustrative cooking parameter section of the cooking program creation form interface of FIG. 4.

FIG. 5 depicts a cooking parameter page 212 of cooking program creation form 208. Cooking parameter page 212 includes a plurality of information fields configured to receive information relating to food item parameters and cooking operation parameters for the cooking program. The information may be input by the user, and/or automatically determined by the cooking program developer tool.

Each of the information fields of cooking program creation form 208 are configured to receive a specific type of information and have a label indicating the type of information the field is configured to receive. As shown in FIG. 5, cooking parameter page 212 includes text-based information fields configured to receive text-based information and drop-down menu information fields configured to provide the user different options to choose from. The text-based information fields are configured to receive information, such as cooking temperature, food item internal temperature, cooking duration, etc. The drop-down menu information fields are configured to receive information, such as finished food item outcome, cooking mode, heating level, etc. Each drop down menu includes one or more options for the user and/or the developer tool to choose from. In some examples, the different options in each drop-down menu are automatically determined by the cooking program developer tool based on the cooking appliance, the food item category, and/or based on the user's previous preferences.

Cooking parameter page 212 includes an option to add a cooking step for the cooking program. In the example shown in FIG. 5, the cooking program includes a preceding cooking step, and a final cooking step. The preceding cooking step is configured to be executed by the cooking appliance prior to executing the final cooking step. For each step the user, and/or the developer tool inputs a cooking mode of the cooking appliance, a cooking temperature, a cooking time, etc. The cooking program may be time based, and/or sensor based. A time-based cooking program uses time elapsed to determine when to transition between different cooking steps, and/or when to terminate the cooking program. Sensor based cooking programs utilize data detected by one or more sensors of the cooking appliance to determine when to transition between steps of the cooking program and/or terminate the cooking process. For example, a sensor based cooking program may utilize an internal temperature of the food item being cooked to determine when to transition between steps of the cooking program, and/or terminate the cooking process.

Cooking program parameter page 212 includes an option to input different cooking parameters for different finished outcomes of the food item. The example shown in FIG. 5 includes the finished outcomes of rare and medium rare. The user, and/or the program developer tool input different cooking parameters for each different finished outcome. The cooking program may include any number of different intended finished outcomes for the food item to be cooked.

In some examples, cooking program parameter page 212 includes a "cooking time varies by" information input field. As shown in FIG. 5, the "cooking time varies by" information input field provides the option to input an additional amount of cooking time for each extra pound the food item weighs above one pound, and/or for each additional inch of thickness the food item is above 1 inch of thickness. Variations in food item thickness, weight, volume, etc. can affect the cooking time for the food item. Including the cooking time varies input field facilitates the cooking program automatically accounting for variations of the food item to be cooked each time the cooking program is executed.

Figure 6:
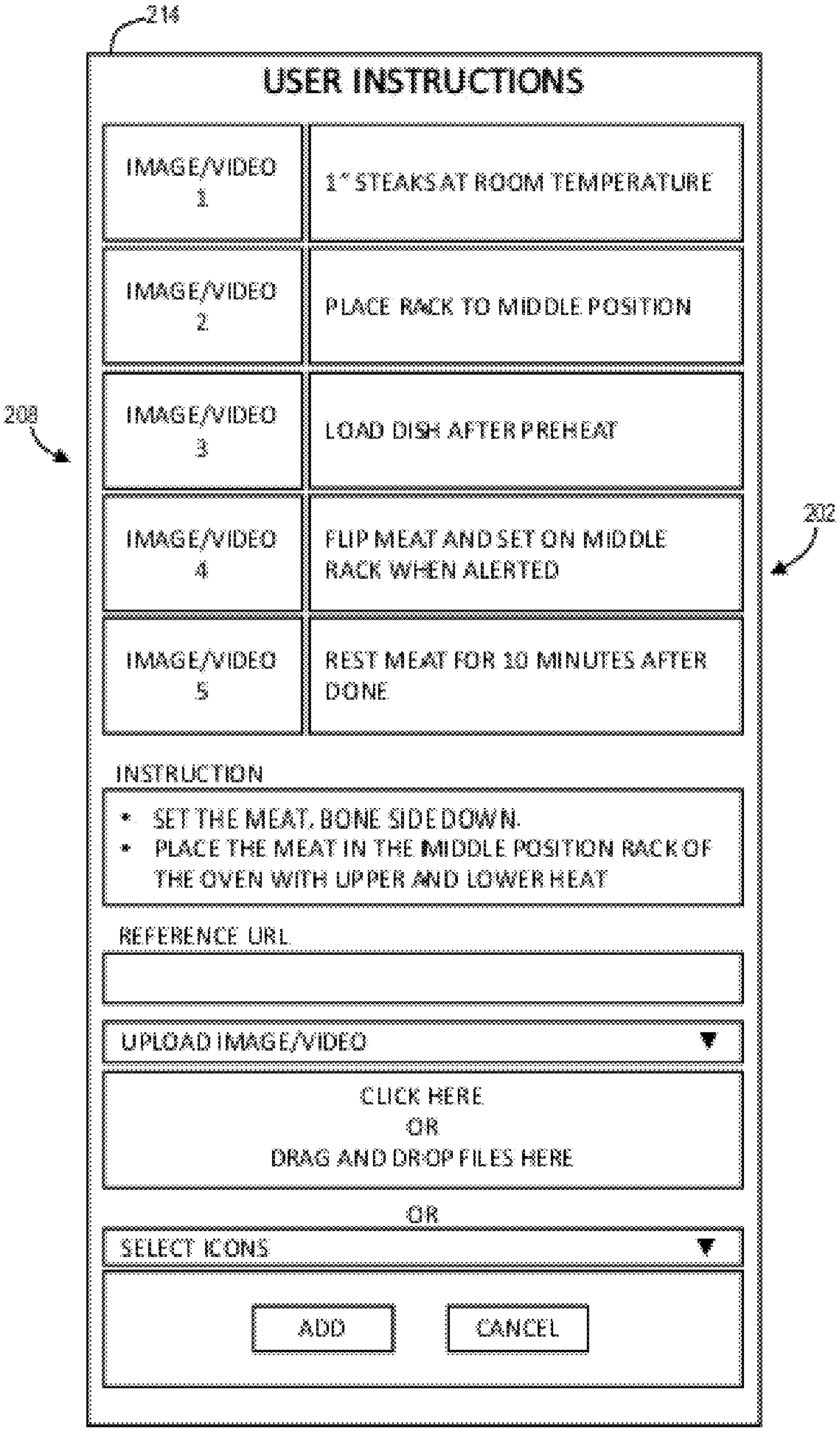
FIG. 6 is an illustrative user instruction section of the cooking program creation form interface of FIG. 4.

FIG. 6 depicts a user instructions page 214 of cooking program creation form 208. User instruction page 214 includes information fields configured to receive information regarding instructions to be displayed to a user to perform during the cooking process. Instructions for the user may include any actions necessary for the user to take to prepare the food item to be cooked and actions for the user to perform during the cooking process (e.g., flipping the food item, resting food item after cooking, turning on or off the cooking appliance, etc.). Instructions may include written instructions, still images, and/or videos showing how to perform the various actions.

Figure 7:
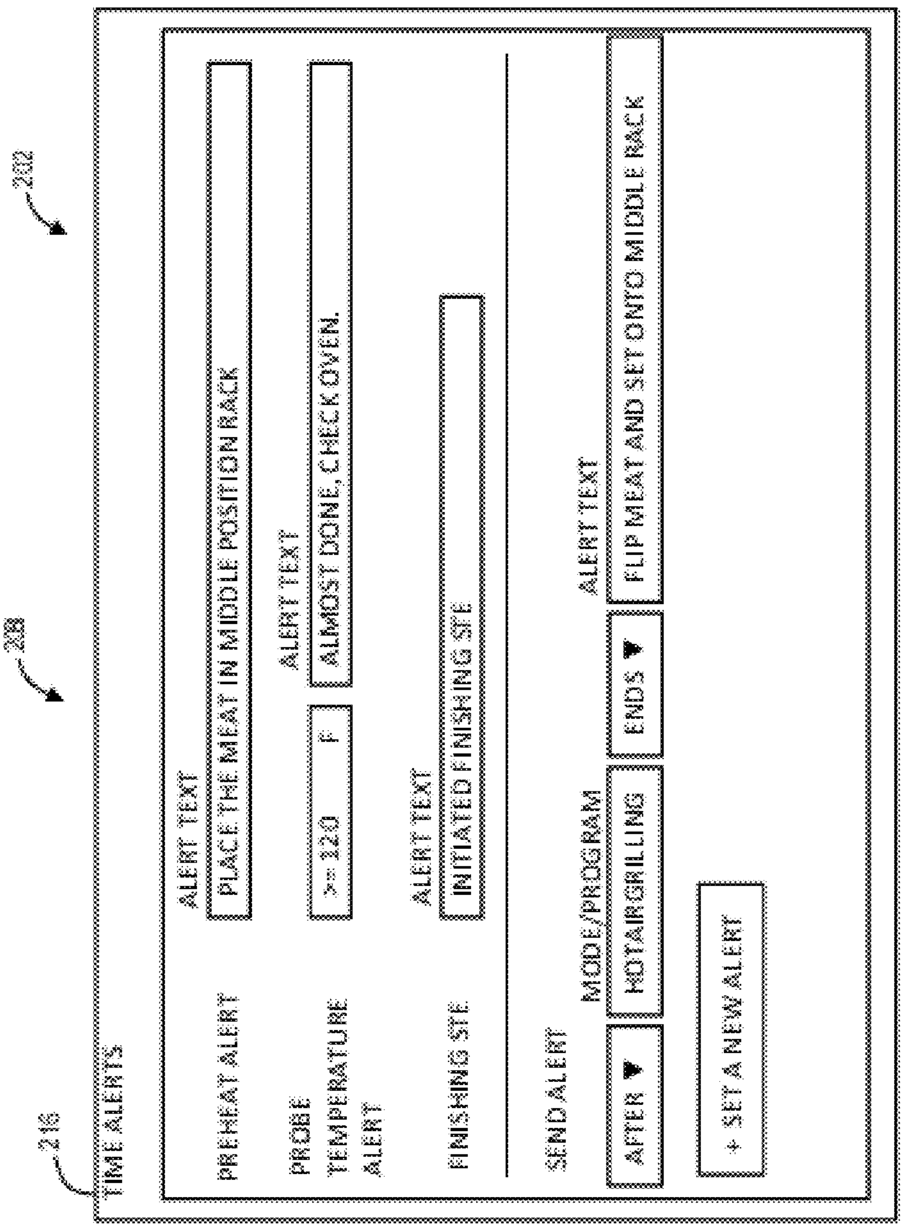
FIG. 7 is an illustrative time alert section of the cooking program creation form interface of FIG. 4.

FIG. 7 depicts a time alerts page 216 of cooking program creation form 208. Time alerts page includes information fields regarding alerts to send to a user throughout the cooking process. Alerts may include messages sent to a user's mobile device, and/or displayed on a user interface of the cooking appliance to alert a user of the current stage of the cooking process, and/or any actions the user may need to perform. In the example shown in FIG. 7, an alert is to be sent to the user after the HOTAIRGRILLING mode ends. The alert includes an alert text to be sent to the user to "Flip meat and set on middle rack". Alerts may be used to prompt a user to perform a specific action, and/or to notify a user of the current stage of the cooking process.

Figure 8:
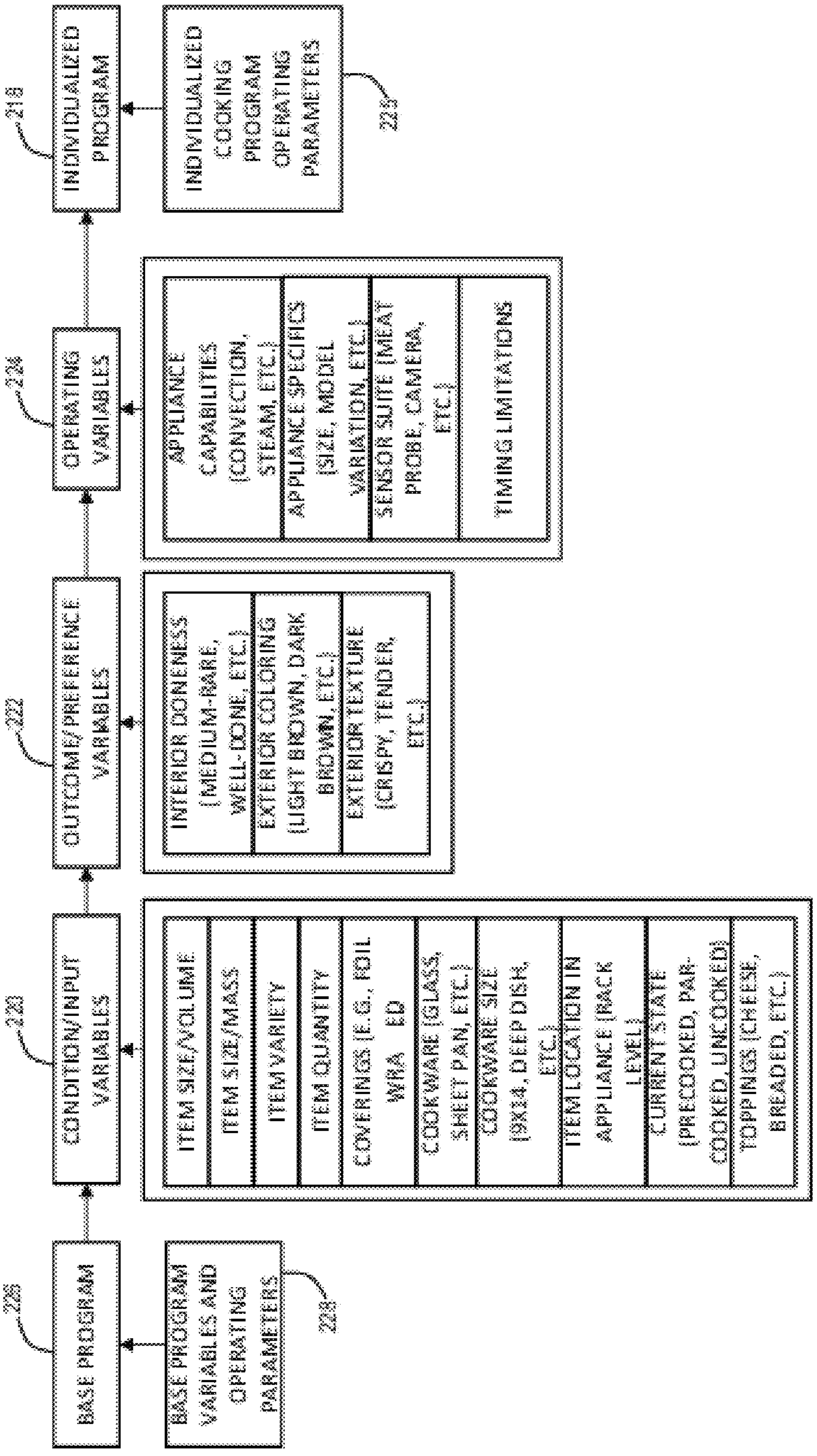
FIG. 8 is a schematic diagram depicting an illustrative process of modifying a base cooking program to create an individualized cooking program in accordance with aspects of the present disclosure.

FIG. 8 depicts an illustrative process of creating an individualized cooking program 218 utilizing a cooking program developer tool of the present disclosure, such as cooking program developer tool 202, described above (see FIGS. 2-7). Cooking program developer tool 202 facilitates the creation of individualized cooking programs 218 that are configured to be utilized by a specific cooking appliance type to cook a specific food item type to have a specific finished outcome for the food item.

In order to create an individualized cooking program 218, program developer 202 tool is configured to receive (e.g., receive in the information fields of cooking program creation form 208) and/or automatically determine input variables 220 (e.g., food item size, food item mass, food item type, cookware information, state of food item prior cooking, etc.), outcome preference variables 222 (e.g., preferred interior doneness of the food item, preferred exterior coloring of the food item, preferred texture of the food item, etc.), and operating variables 224 (e.g., appliance type, appliance capabilities, available appliance sensors, etc.) for individualized cooking program 218. Specific operating parameters 225 (e.g., cooking temperature, cooking duration, cooking mode, trigger events etc.) are then determined based on the input variables 220, outcome preference variables 222, and operating variables 222. Operating parameters 225 direct operation of the cooking appliance when cooking the food item and are dependent on the different variables. In some examples, operating parameters 225 for the individualized cooking program are input by a user into cooking parameter page 212 of cooking program creation form 208. In some examples, cooking program developer tool 202 is configured to automatically determine operating parameters 225 for individualized program 218 based on input variables 220, outcome preference variables 222, and operating variables 224.

Cooking program creation form 208 of creation tool 202 provides information fields and prompts configured to guide a user in providing input variables 220, outcome preference variables 222, and operating variables 224 for individualized cooking program 218. For example, information fields configured to receive input variables 220 (e.g., food item weight, thickness, quantity, type, etc.), outcome preference variables 222, and operating variables 224 are provided in general information page 210 and cooking parameter page 212 of cooking program creation form 208 (See FIGS. 4 and 5). Input variables 220, such as cookware information and food item state, may be provided in information fields of user instruction page 214 to direct a user to use a specific type of cookware or begin the cooking process with the food item in a specific state. Operating parameters 225 of individualized cooking program 218 may be input into the information fields of cooking parameter page 212 of creation form 208.

As shown in FIG. 8, cooking program developer tool 202 may be utilized to create individualized cooking program 218 (AKA child cooking program) based on a base cooking program 226 (AKA parent cooking program). Base cooking program 226 may be a pre-existing cooking program that is configured to cook a same food item type as individualized cooking program 226. Base cooking program 226 includes a set of base program variables and operating parameters 228. Base program variables and parameters 228 may include input variables, outcome preference variables, operating variables, and/or appliance operating parameters for cooking the food item. A user of program developer tool 202 may desire to modify base cooking program 226 to have different input variables, outcome preference variables, and/or operating variables according to the user's preferences. For example, the user may desire to cook the food item to a different finished outcome than the base program, utilize a different cooking appliance type to cook the food item, cook a different quantity of the food item, utilize different cookware to cook the food item, etc.

Developer tool 202 facilitates the modification of base cooking program 226 to create individualized program 218 according to the user's preferences and available equipment (e.g., available cooking appliances, food item quantity, cookware, etc.). In some examples, variables and parameters 228 of base program 226 are initially input into a program creation form 208 and a user modifies one or more of the input variables, outcome variables, and/or operating variables of base program 226 in the creation form. In some examples, developer tool 202 automatically modifies one or more information fields of base program 226 in creation form 208. Appliance operating parameters 225 for individualized program 218 may then be determined based on the modified input, outcome, and operating variables of base program 226.

Figure 9:
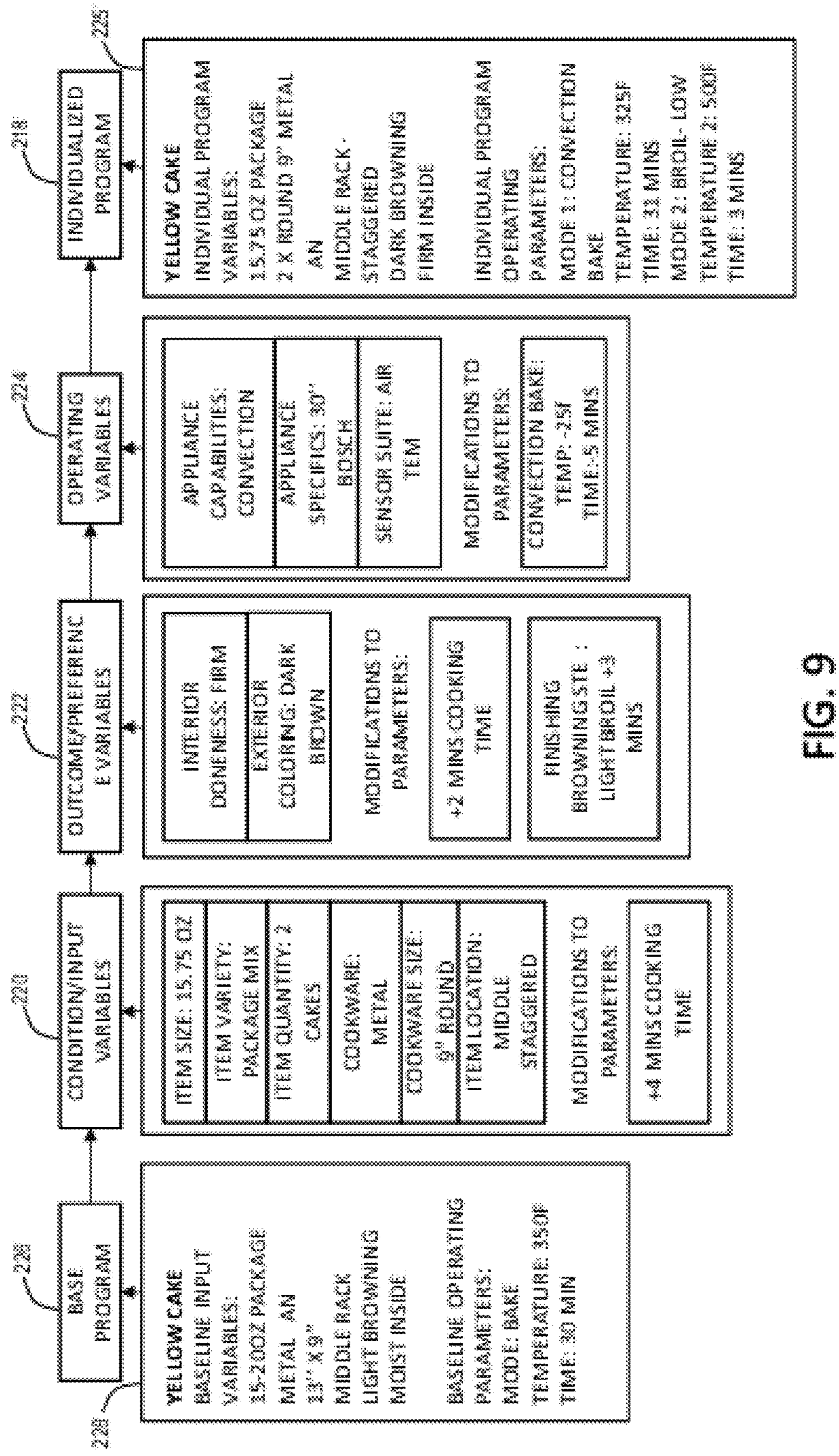
FIG. 9 is a schematic diagram depicting an illustrative example of creating an individualized cooking program utilizing the process of FIG. 8.

FIG. 9 depicts a specific example of modifying a base program 226' to create an individualized cooking program 218' utilizing the process depicted in FIG. 8 and described above. In the example of FIG. 9, base cooking program 226' is for cooking yellow cake. As shown in FIG. 9, base cooking program 226' has a set of baseline variables and baseline operating parameters 228' for cooking yellow cake. The baseline variables include food item variety (package cake mix), cookware (13"×9" metal pan), food item location in cooking appliance (middle rack), intended finished outcome of food item (light browning and moist inside). The baseline cooking parameters for base cooking program 226' are based on the baseline variables and include a cooking mode (bake), cooking temperature (350F), and a cooking time (30 mins).

Developer tool 202 facilitates the user modifying baseline variables and parameters 228' of base cooking program 226' to generate individualized cooking program 218' according to the user's preferences. In the example of FIG. 9, the user modifies input variables 220' to include an item quantity of two cakes and a 9" round pan. The user modifies outcome variables 222' for individualized program 218' to be an interior doneness of firm and an exterior coloring of dark brown for the yellow cake. Additionally, in the example of FIG. 9, the user modifies the capabilities of the cooking appliance to include a convection baking mode rather than a conventional baking mode.

Modifications to the baseline cooking parameters are determined by developer tool 202 and/or by the user based on each of the modifications to input variables 220', outcome variables 222', and operating variables 224'. In the example of FIG. 9, based on the modifications of input variables 220' to include an item quantity of two cakes and a 9" round pan, four minutes of cooking time is added to baseline operating parameters 228' of base program 226'. Based on the modification of outcome variables 222' for the yellow cake to have an interior doneness of firm and an exterior coloring of dark brown, two additional minutes of cooking time is added and an extra finishing cooking step of broiling is added to achieve the dark brown exterior coloring. Based on the modification of the cooking appliance to utilize a convection bake mode, the cooking temperature is reduced by 25F and the cooking time is reduced by 5 minutes. A new set of operating parameters 225' is able to be generated for individualized program 218' based on each of the determined modifications of baseline parameters 228', described above.

In some examples, program developer tool 202 is configured to automatically determine new set of operating parameters 225' (e.g., cooking temperature, cooking duration, additional finishing step, etc) for individualized cooking program 218' based on baseline parameters 228' and the user modifications of the input, outcome, and operating variables. For example, program developer tool 202 may have one or more machine learning algorithms configured to receive as input baseline variables and cooking parameters 228' of base program 226' and the user modifications of the base program's input, outcome, and operating variables. The one or more machine learning algorithms may be trained to then output new set of operating parameters 225' for individualized program 218'. In some examples, the user manually inputs new operating parameters 225' for the new individualized program based on the change to a convection oven.

In the above-described manner, cooking program developer tool 202 facilitates the easy creation of new individualized cooking programs that are specific to the user's preferences and the equipment available to the user (e.g., available cooking appliances, cookware, etc.). Additionally, cooking program developer tool 202 allows for the modification of existing cooking programs or base programs to create new individualized cooking programs specific to the user's preferences. After the individualized cooking programs are created utilizing the developer tool, the user may test the cooking programs to determine if the program performs satisfactorily. If the user finds the performance of the program unsatisfactory, the program developer tool may be utilized to further modify the individualized program until the user is satisfied with the program's performance.

The base cooking programs and individualized cooking programs created utilizing the developer tool may be shared in a virtual cooking program marketplace. Sharing the base cooking programs and individualized cooking programs in the virtual cooking program marketplace allows other users of the program developer tool to access and utilize the cooking programs. The other users may utilize the developer tool to further modify the base cooking programs and individualized programs shared in the marketplace according to the other user's own preferences. In this manner, the developer tool and cooking program marketplace facilitate the rapid development of a variety of different cooking programs configured to account for different input, outcome, and operating variables.

C. Illustrative Method of Creating a New Cooking Program

Figure 10:
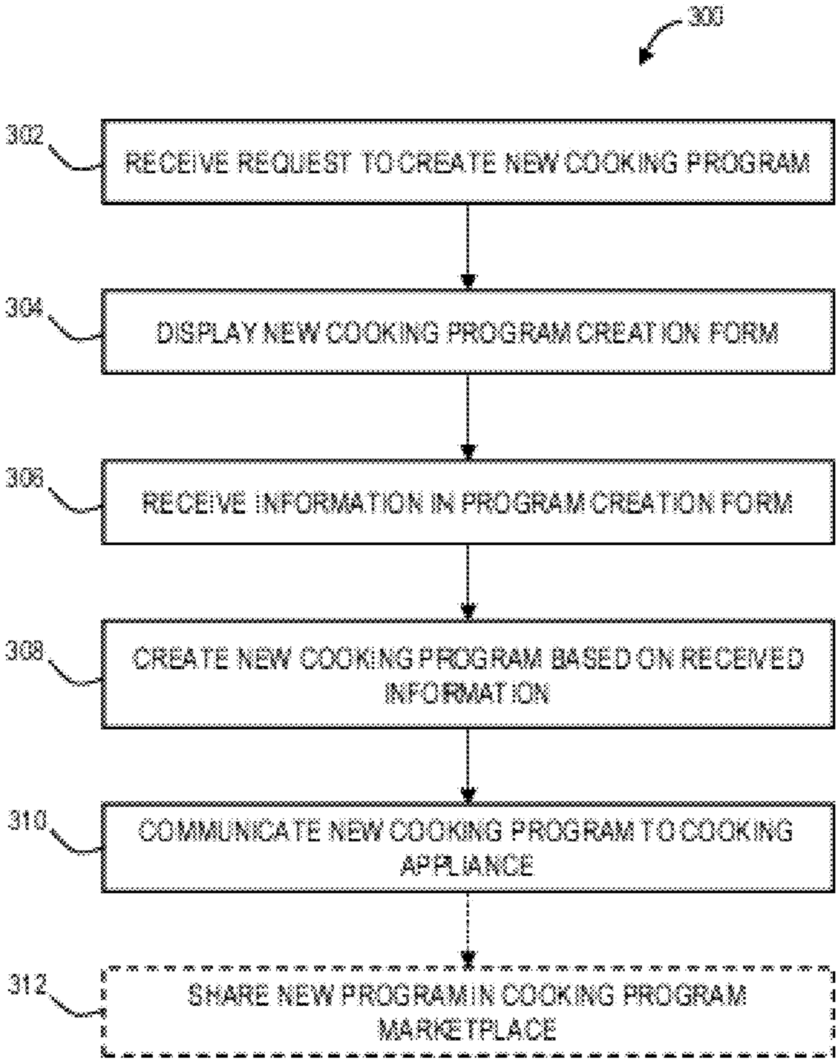
FIG. 10 is an illustrative flow chart depicting steps of an illustrative method for creating a new cooking program in accordance with aspects of the present disclosure.

This section describes steps of an illustrative method 300 for creating a new cooking program utilizing a cooking program developer tool; see FIG. 10. Aspects of cooking program development systems 100 and cooking program developer tool 202 may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 300 are described below and depicted in FIG. 10, the steps need not necessarily all be performed, and in some cases may be performed simultaneously or in a different order than the order shown.

Step 302 of method 300 includes receiving a request to create a new cooking program. In some examples, the user accesses the cooking program developer tool and requests to create the new cooking program via a user interface of the user's mobile device, a user interface of the user's cooking appliance, and/or using any other suitable device. The user may request to create a new cooking program on the cooking program dashboard interface, described above.

Step 304 of method 300 includes displaying a new cooking program creation form. The cooking program creation form may be substantially similar to the cooking program creation form depicted in FIGS. 4-7 and described above. The cooking program creation form may be displayed on a user interface of the user's mobile device, on a user interface of a cooking appliance, and/or on any other suitable user interface capable of displaying the cooking program creation form and allowing the user to interact with the form.

The new cooking program creation form may include a plurality of information fields configured to be populated by information provided by the user, and/or information automatically determined by the cooking program developer tool. Each information field of the cooking program creation form is configured to receive a specific type of information and includes a label indicating the type of information the information field is configured to receive. The information fields may be configured to receive text-based information, and/or be configured as drop-down menus providing different options for a user to select from.

In some examples, the number and type of information fields displayed on the cooking program creation form may be automatically determined by the cooking program developer tool. For example, the cooking program developer tool may first request a user to input a category of the food item and cooking appliance type for the cooking program. Based on this information the cooking program developer tool automatically determines the information fields to include in the cooking program creation form. The information fields may include a program name, characteristics of the food item or meal, the cooking appliance, the cooking appliance parameters for cooking the food item, the user's desired finished preference for the food item or meal, user instructions, trigger events or alerts, and/or any other suitable information necessary to create a cooking program for the food item or meal.

Step 306 of method 300 includes receiving information in the program creation form. The program developer tool receives, from the user, the information input into the creation form described in step 304. In some examples, the system is configured to automatically provide information in one or more information fields of the creation form based on the information received from the user. For example, the user may input a food item type and a cooking appliance, and the cooking program developer tool automatically determines one or more cooking parameters for the cooking program. In some examples, the cooking program developer tool automatically determines an expected cooking time for the cooking program based on the food item type and cooking parameters input by the user. The cooking program developer tool may utilize trained machine learning models, algorithms, formulas, existing cooking programs, and/or any other suitable method to automatically determine the information for the cooking programs. The information received in the creation form may include information relating to the food item and cooking appliance of the cooking program and instructions to be executed by the cooking appliance to cook the food item according to the cooking program.

Step 308 of method 300 includes creating a new cooking program based on the information received in the creation form in step 306. After a user and/or the cooking program developer tool provides information in each information field of the creation form, the user may select a "create" button on the creation form to create a new cooking program based on the information in the creation form. The new cooking program includes information relating to the food item and cooking appliance of the cooking program and instructions configured to be executed by the cooking appliance to cook the food item. The instructions may include cooking preparation steps, instructions to display to the user to prepare the food item or meal, cooking parameters, trigger events to transition to a next step of the cooking process, alerts to send to the user, and/or any other instructions necessary for the cooking process. The new cooking program may be saved on the user's mobile device, the user's cooking appliance, and/or in any other suitable location.

Step 310 of method 300 includes communicating the new cooking program to the cooking appliance. In some examples, the new cooking program may be sent to the cooking appliance in response to the system receiving a request from the user to utilize the cooking program. The new cooking program may be communicated to a single cooking appliance or a plurality of cooking appliances, and the system may communicate the new cooking program to the cooking appliance wirelessly through a local network, and/or by any other suitable method.

Step 312 of method 300 includes sharing the new program in a cooking program marketplace. Sharing the cooking program in the cooking program marketplace allows other users to access and utilize the created cooking program to cook the food item or meal.

D. Illustrative Method of Modifying an Existing Cooking Program

Figure 11:
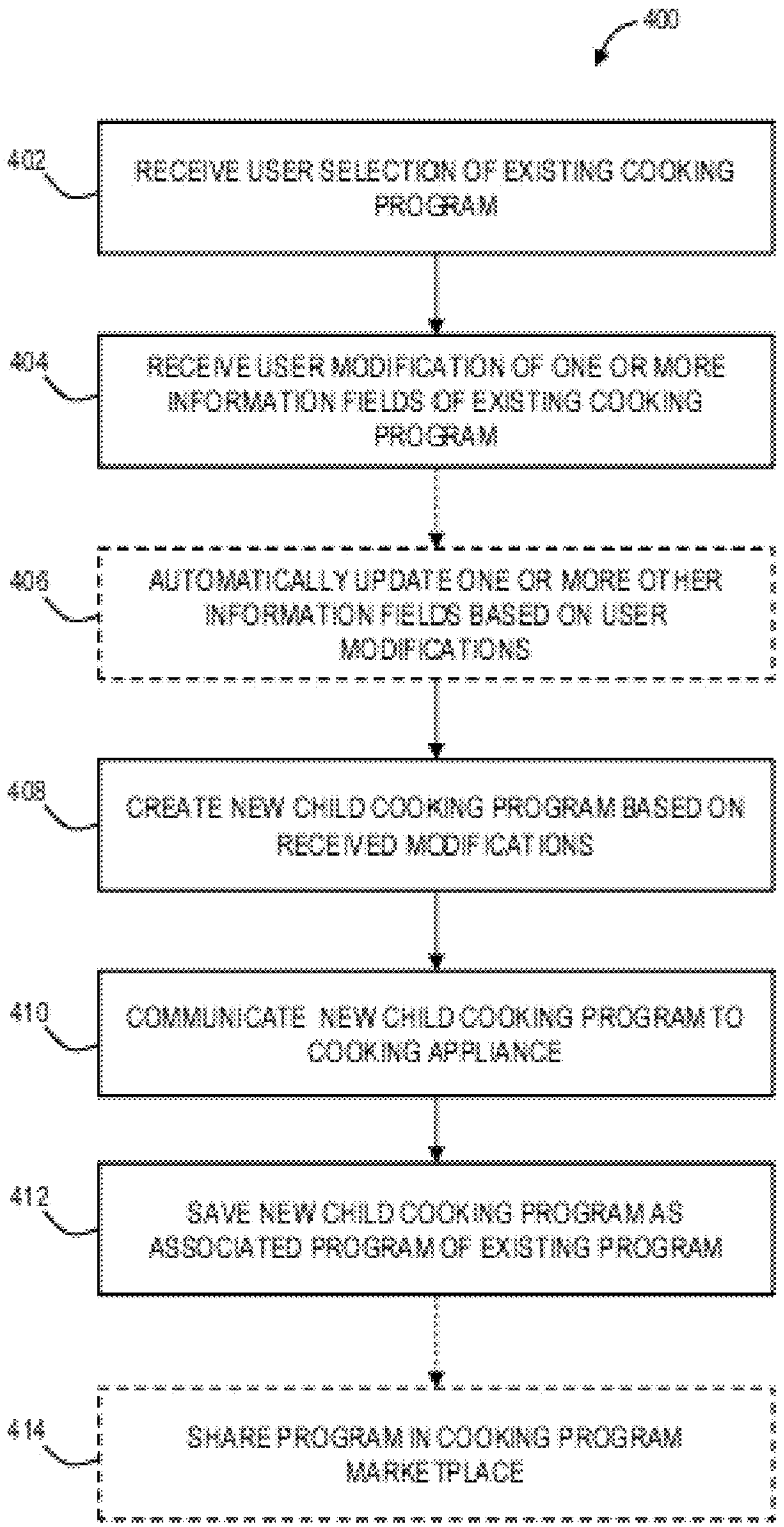
FIG. 11 is an illustrative flow chart depicting steps of an illustrative method for modifying an existing cooking program in accordance with aspects of the present disclosure.

This section describes steps of an illustrative method 400 for modifying an existing cooking program using a cooking program developer tool; see FIG. 11. Aspects of cooking program development system 100 and/or cooking program developer tool 202 may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 400 are described below and depicted in FIG. 11, the steps need not necessarily all be performed, and in some cases may be performed simultaneously or in a different order than the order shown.

Step 402 of method 400 includes receiving a selection of an existing cooking program. The existing cooking program may be a cooking program created by the user and/or a cooking program created by a different user and shared in a cooking program marketplace. In some examples, the user selects the existing cooking program from the cooking program dashboard of the cooking program developer tool, described above. In some examples, in response to receiving the selection, the cooking program developer tool displays a copy of the cooking program creation form of the selected cooking program to the user and requests a modification of the information input into one or more information fields of the creation form.

Step 404 of method 400 includes receiving user modification of one or more information fields of the existing cooking program creation form. The user modified information fields may include cooking parameters, cooking appliance, trigger events, user instructions, and/or any other information fields of the existing cooking program creation form. The user may modify the one or more information fields to achieve a different finished outcome of the food item, utilize a different cooking appliance, cook the food item faster or slower, and/or for any other suitable reason.

Step 406 of method 400 includes automatically updating one or more information fields of the existing cooking program creation form based on the user modifications in step 404. In some examples, the cooking program developer tool is configured to automatically modify one or more variables of the existing cooking program based on the user modifications. For example, the user modifies, in step 404 of method 400, the cooking appliance from a regular oven to a convection oven, and the cooking program developer tool automatically determines a new cooking duration for the cooking program based on the change of the cooking appliance. The cooking program developer tool may utilize conversion algorithms, machine learning models, existing cooking programs, and/or any other suitable method to determine automatically the modifications of the existing cooking program.

Step 408 of method 400 includes creating a new child cooking program based on the received modifications of the existing cooking program. The new cooking program is a child cooking program of the existing cooking program, and the existing cooking program is a parent cooking program of the new cooking program. The new child cooking program includes information relating to the food item and the cooking appliance of the new child cooking program and instructions configured to be utilized by the cooking appliance to cook the food item according to the new cooking program.

Step 410 of method 400 includes communicating the new child cooking program including the instructions to the cooking appliance. In some examples, the cooking program developer tool is configured to communicate the new cooking program to the cooking appliance in response to receiving a request from the user to execute the new cooking program. The cooking program developer tool may communicate the cooking program to the cooking appliance wirelessly via a local network, and/or by any other suitable method.

Step 412 of method 400 includes saving the new modified child cooking program as an associated child cooking program of the existing parent cooking program. Associating the child cooking program with the parent cooking program facilitates the modification of each program, if one of the programs is determined to have negative user feedback. In some examples, in response to the cooking program feedback tool receiving negative feedback regarding either the parent or modified child cooking program, the cooking program developer tool is configured to request modification, and/or automatically modify both the child cooking program and the parent cooking program.

Step 414 of method 400 includes sharing the cooking program in the cooking program marketplace. In some examples, the new child cooking program is shared in the cooking program marketplace, such that the new child cooking program can be utilized by other users of the marketplace.

E. Illustrative Method of Executing a Cooking Program

Figure 12:
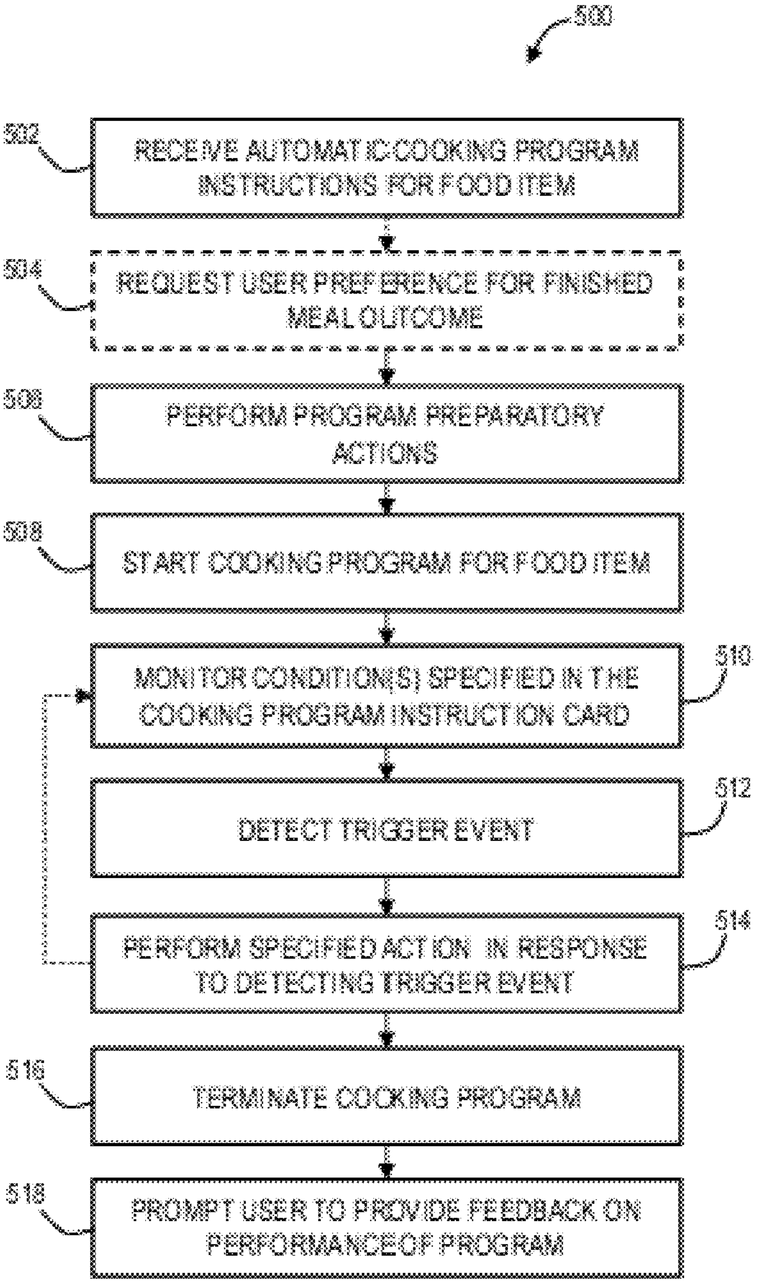
FIG. 12 is an illustrative flow chart depicting steps of an illustrative method for executing a cooking program in accordance with aspects of the present disclosure.

This section describes steps of an illustrative method 500 for executing an automatic cooking program by a cooking appliance; see FIG. 12. Aspects of cooking program development systems 100 and cooking program developer tool 202 may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

Step 502 of method 500 includes receiving an automated cooking program configured to be utilized by a cooking appliance to cook a food item. The automated cooking program may be received by a cooking appliance configured to automatically execute the instructions of the cooking program to cook the food item. In some examples, the automatic cooking program is created using the cooking program developer tool and sent by the cooking program developer tool to the cooking appliance, in response to a request from a user to execute the cooking program. In some examples, the user requests to use a specific cooking program via the cooking program developer tool on a user's mobile device. In some examples, the user requests executing the specific cooking program via a user interface on the cooking appliance. The cooking program developer tool may send the automated cooking program to the cooking appliance wirelessly via a local network, and/or in any other suitable manner.

Step 504 of method 500 includes requesting the user's preference for the finished outcome of the meal. In some examples, the instructions of the automatic cooking program include requesting, by the cooking appliance, the user's finished preference for the food item to be cooked. The automatic cooking program includes different instructions for the cooking appliance to execute during the cooking process dependent on the user's selection of the user's finished preference for the food item. For example, if the cooking program is configured to cook a steak, the cooking duration and/or cooking temperature may vary depending on the user's preference for the doneness of the steak.

Step 506 of method 500 includes performing program preparatory actions. Performing the program preparatory actions includes performing, by the cooking appliance, actions such as preheating the cooking appliance and/or displaying cooking program preparation instructions to the user. The cooking program preparation instructions displayed to the user include the necessary actions for the user to prepare the food item to be cooked. For example, the user cooking program preparation instructions may include a list of ingredients and an amount of each ingredient needed for the cooking program, any actions needed to prepare the ingredients or food items themselves (e.g., cutting, mixing of multiple ingredients together, emulsifying, etc.), and/or any other suitable necessary actions for the user to prepare to cook the meal. The user cooking program preparation instructions may include a description of the necessary user actions, and/or video or still images showing how to properly perform the necessary user actions. The cooking program preparation instructions may be displayed to the user on a user interface of the cooking appliance, and/or a user interface of the user's mobile device.

Step 508 of method 500 includes starting the cooking program for the food item. In some examples, starting the cooking program for the food item includes requesting the user to insert the food item(s) of the meal into the cooking appliance. In some examples, the cooking appliance is instructed by the instructions of the cooking program to detect one or more characteristics of the food item(s) at the start of the cooking program. Detecting the one or more characteristics of the food item, at the start of executing the cooking program, facilitates monitoring the characteristics of the food item throughout the cooking process, and/or utilizing the one or more characteristics of the food item to determine a cooking parameter of the cooking program. For example, the cooking appliance may be instructed to determine an initial brownness level of the food item and monitor the brownness level of the food item throughout the cooking process. In some examples, the cooking appliance is instructed to determine a weight, thickness, quantity, and/or other property of the food item(s) and to automatically determine a cooking duration based on the determined property of the food item(s). For example, the instructions may indicate that for every extra pound the food item weighs above a baseline weight the cooking appliance should cook the food item for an additional 3 minutes.

Step 510 of method 500 includes monitoring one or more conditions of the food item, and/or of the cooking appliance itself as specified in the instructions of the cooking program. Conditions of the food item to be monitored by the cooking appliance may include an internal temperature of the food item, a brownness level of the food item, and/or a volume of the food item. Other conditions to be monitored by the cooking appliance during the cooking process may include a temperature of air within the cooking appliance, a temperature of a portion of the cooking appliance itself, and/or an amount of time elapsed. In some examples, the cooking appliance includes one or more sensors configured to monitor the conditions of the food item and/or the conditions of the cooking appliance itself.

Step 512 of method 500 includes detecting a trigger event. In some examples, detecting the trigger event includes detecting one or more of the monitored conditions reaching a threshold or predetermined level. For example, the monitored condition is an internal temperature of the food item, and the trigger event is detected when the internal temperature of the food item is 125 F. In some examples, the monitored condition is an amount of time elapsed from the start of the cooking program and/or from the last trigger event, and the trigger event occurs when a specific amount of time has elapsed. The specific trigger events for the cooking program are included in the instructions of the cooking program.

Step 514 of method 500 includes performing an action specified in the instructions of the cooking program, in response to detecting the trigger event. The specified action may include transitioning between different cooking steps of the cooking program, requesting the user to manipulate the food item, alerting the user of the progress of the cooking program, terminating the cooking program, and/or any other suitable action taken by the cooking appliance. Transitioning between different steps of the cooking program may include changing the cooking temperature and/or the cooking mode being utilized by the cooking to cook the food item. In some examples, the cooking appliance alerts the user, requests a user action via a user interface of the cooking appliance, and/or sends an alert or message to the user's mobile device. In some examples, after performing the specified action, the cooking appliance returns to step 510 of the method if the cooking process has not been completed.

Step 516 of method 500 includes terminating the cooking program. In response to detecting the final trigger event, the cooking appliance is configured to terminate the cooking program. Terminating the cooking program may include shutting off power to the cooking appliance and/or alerting the user the food item is finished cooking. In some examples, the cooking appliance is instructed by the cooking program to notify the cooking program developer tool and/or the cooking program feedback tool that the cooking process is completed.

Step 518 of method 500 includes prompting the user to provide feedback regarding the performance of the cooking program. In some examples, the user is prompted immediately after the termination of the cooking program. In some examples, the user is prompted to provide the feedback a certain duration of time after the cooking appliance terminates the cooking process. In some examples, the user is prompted to provide the feedback on the user interface of the cooking appliance. In some examples, the user is prompted to provide the feedback on a user interface of the user's mobile device.

F. Illustrative Method of Utilizing User Feedback

Figure 13:
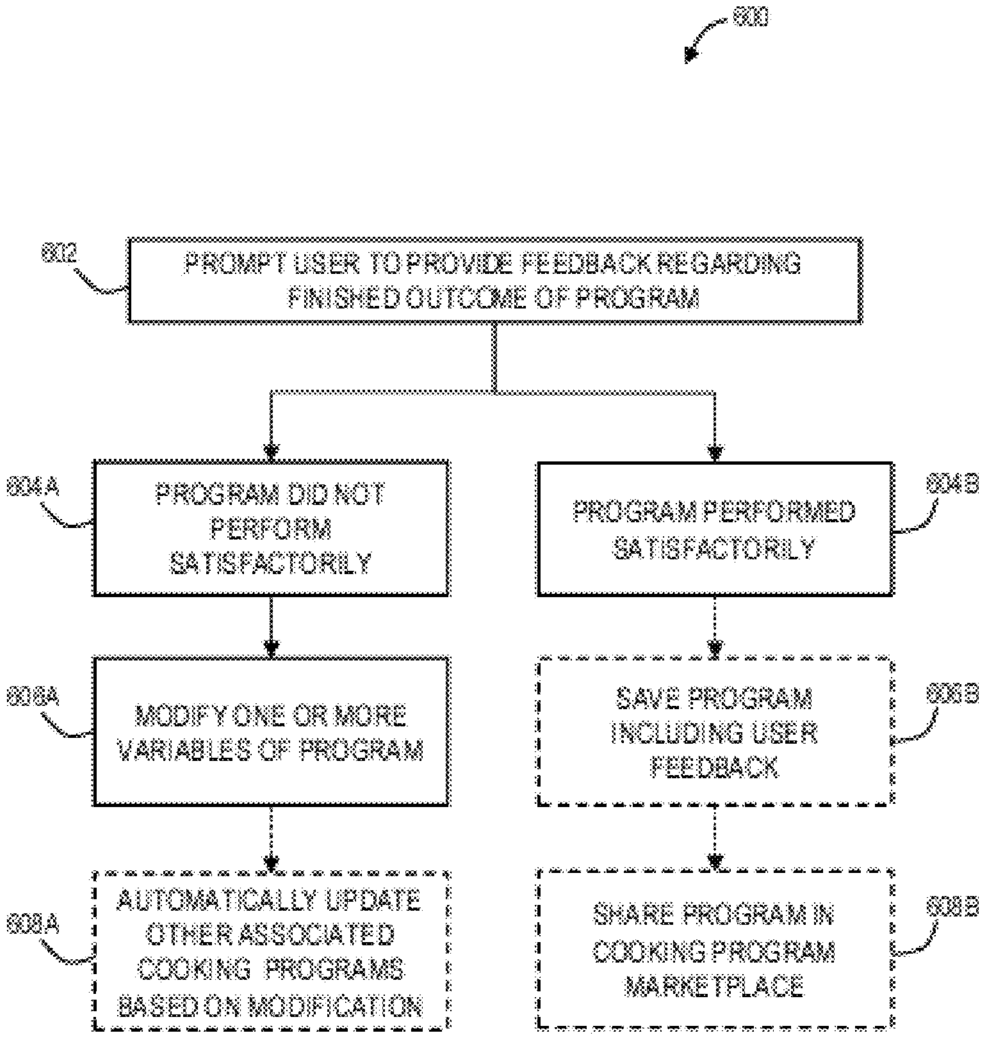
FIG. 13 is an illustrative flow chart depicting steps of an illustrative method for receiving and utilizing user feedback regarding a cooking program in accordance with aspects of the present disclosure.

This section describes steps of an illustrative method 600 for receiving and utilizing user feedback regarding a specific cooking program to modify the program; see FIG. 13. Aspects of cooking program development systems 100 and/or 200 may be utilized in the method steps described below. Where appropriate, reference may be made to components and systems that may be used in carrying out each step. These references are for illustration, and are not intended to limit the possible ways of carrying out any particular step of the method.

FIG. 13 is a flowchart illustrating steps performed in an illustrative method, and may not recite the complete process or all steps of the method. Although various steps of method 600 are described below and depicted in FIG. 13, the steps need not necessarily all be performed, and in some cases may be performed simultaneously or in a different order than the order shown.

Step 602 of method 600 includes prompting a user to provide feedback regarding a performance of a cooking program. The cooking program feedback tool may request the user feedback via a user interface of the cooking appliance and/or via a user's mobile device. The cooking program feedback tool may prompt the user to provide feedback immediately after receiving notification of a termination of the cooking program by the cooking appliance or after a set amount of time elapses after the termination of the cooking program. Additionally or alternatively, the cooking program feedback tool may request, from the cooking appliance, sensor data collected by the cooking appliance during the cooking process.

The cooking program feedback tool may prompt the user to provide categorical feedback (e.g., very satisfied, satisfied, unsatisfied, etc.), rating-based feedback (e.g., 1/5, 3/5, 5/5, etc.), and/or a written description. In some examples, the user is prompted to provide feedback regarding a comparison between an expected finished outcome of the food item cooked using the cooking program and an actual finished outcome of the food item cooked using the cooking program.

Step 604A of method 600 includes receiving feedback indicating the cooking program did not perform satisfactorily. In some examples, it is determined the cooking program performed unsatisfactorily, if the finished outcome of the food item did not match the expected finished outcome or the users desired finished outcome for the food item. In some examples, it is determined the cooking program performed unsatisfactorily, if the cooking program is rated below a predetermined level, the user explicitly states or selects an option that the cooking program did meet expectations, and/or if the received feedback includes a rating of "unsatisfied".

Step 604B of method 600 includes receiving feedback indicating the cooking program performed satisfactorily. The cooking program feedback tool may determine the feedback indicates satisfactory performance if the received feedback gives a rating of the cooking program above a predetermined level, the user selects an option that the cooking program met expectations, and/or if the received feedback includes a rating of satisfied or very satisfied.

Step 606A of method 600 includes modifying one or more variables of the cooking program in response to receiving, in step 604A, the feedback indicating the cooking program performed unsatisfactorily. In some examples, the cooking program developer tool is configured to prompt the user to modify the one or more variables of the cooking program in response to receiving the feedback. In some examples, the cooking program developer tool is configured to automatically modify the one or more variables of the cooking program based on the received feedback. For example, if the user feedback indicates the food item was overcooked by the cooking program, the cooking program developer tool may automatically reduce the cooking temperature of the cooking program and/or the cooking time of the cooking program.

Step 606B of method 600 includes saving the cooking program including the received feedback indicating the performance of the cooking program. Saving the feedback indicating the satisfactory performance of the cooking program may remind the user to use the cooking program again in the future. If the cooking program is uploaded to the cooking program marketplace, the received feedback may indicate to other users to use the program because the feedback indicates the cooking program performs satisfactorily.

Step 608A of method 600 includes automatically updating other associated cooking programs based on the modification to the cooking program made in step 606A of method 600. In some examples, the cooking program is part of a cooking program family. The cooking program may have been created based on a previously existing cooking program and/or other cooking programs may have been created based on the cooking program. Because all cooking programs in the cooking program family are based on each other, it may be useful to modify the other cooking programs in the cooking program family based on the modifications made to the cooking program in step 606A of method 600. For example, the received user feedback regarding the performance of a first cooking program indicates the cooking program cooked a steak medium, when the cooking program was intended to cook the steak rare. A second cooking program was created based on the first cooking program, and the second cooking program was intended to cook a steak to be medium. It may be determined from this information that the second cooking program likely will overcook the steak, because the cooking parameters of the second cooking program are based on the first cook program that overcooked the steak. Thus, the user and/or the cooking program developer tool modify the second cooking program to reduce the cooking time, and/or the cooking duration of the second cooking program and the first cooking program. Modifying the other cooking programs in a cooking program family facilitates the rapid improvement of each of the programs in the family, without needing to test each program individually.

Step 608B of method 600 includes sharing the cooking program including the received feedback for the cooking program in the cooking program marketplace. Sharing the cooking program in the cooking program marketplace allows other users access to the cooking program. The user feedback regarding the cooking program is shared in the marketplace to inform the other users of the performance of the program.

G. Illustrative Method of Developing Cooking Programs

Figure 14:
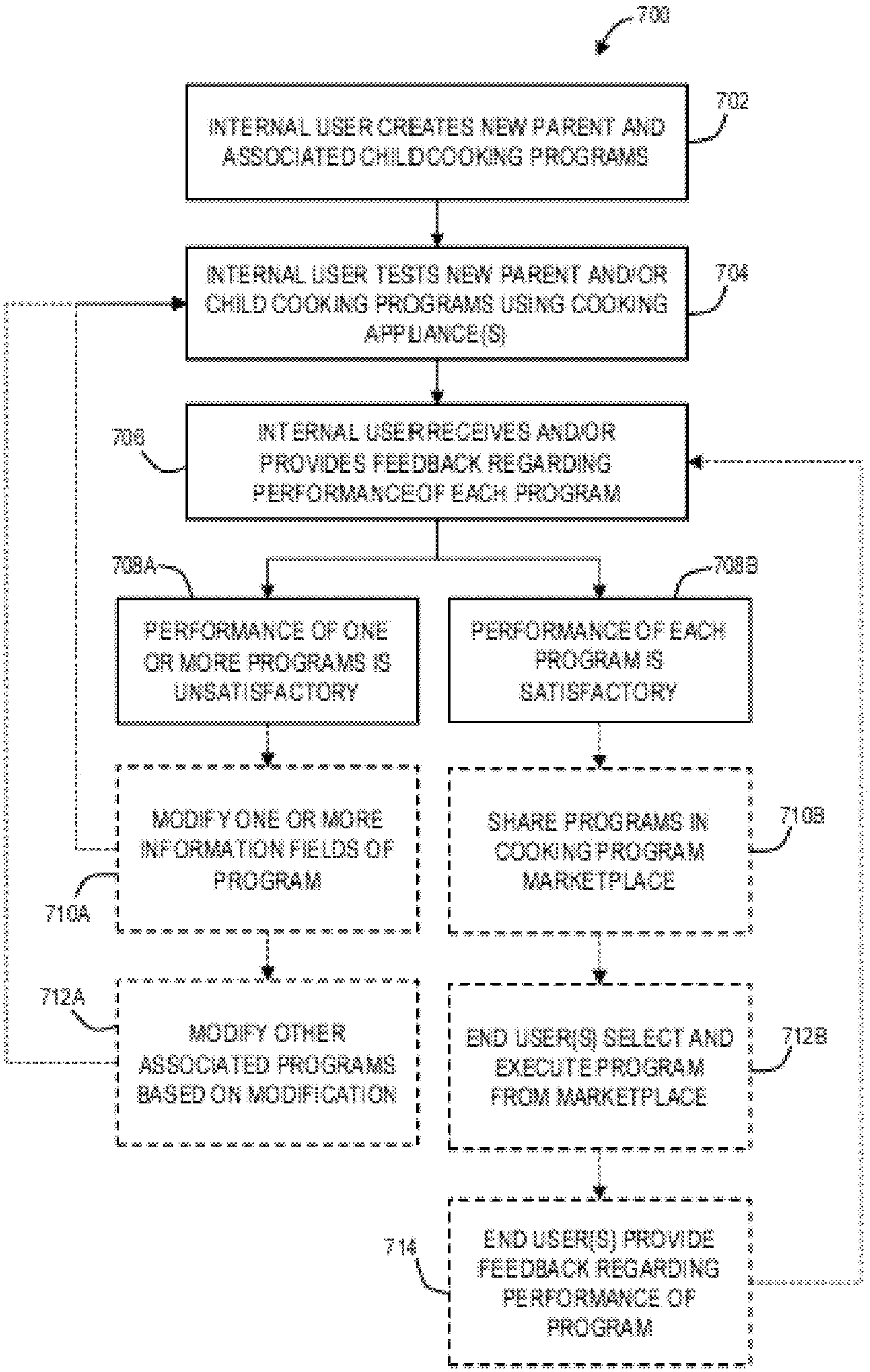
FIG. 14 is an illustrative flow chart depicting steps of an illustrative method for creating and modifying cooking programs in accordance with aspects of the present disclosure.

This section describes steps of an illustrative method 700 for developing cooking programs; see FIG. 14. Aspects of cooking program development systems 100 and/or cooking program developer tool 202 may be utilized in the method steps described below. Where appropriate, reference may be made to components and systems that may be used in carrying out each step. These references are for illustration, and are not intended to limit the possible ways of carrying out any particular step of the method.

FIG. 14 is a flowchart illustrating steps performed in an illustrative method, and may not recite the complete process or all steps of the method. Although various steps of method 700 are described below and depicted in FIG. 13, the steps need not necessarily all be performed, and in some cases may be performed simultaneously or in a different order than the order shown.

Step 702 of method 700 includes creating, by an internal user, a new parent cooking program and associated child cooking programs for a food item or meal. The internal user may include an individual employed by an organization that sells cooking appliances, and/or creates and tests automated cooking programs to be shared with end users. End users may include individuals that purchase cooking appliances and utilize the cooking programs. In some examples, the internal user utilizes the cooking program creation form of the cooking program developer tool to first create the parent cooking program. The internal user inputs information regarding the food item type, cooking appliance type, cooking parameters, trigger events, user instructions, and/or time alerts. In some examples, the internal user utilizes existing cooking programs to determine the information to input into the cooking program creation form. In some examples, the cooking program developer tool is configured to automatically determine, based on the user input, one or more of the food item type, cooking appliance type, cooking parameters, trigger events, user instructions, and/or time alerts. The cooking program developer tool may utilize one or more formulas or algorithms, machine learning models, and/or existing cooking programs to determine the information.

The internal user may create one or more child cooking programs based on the created parent cooking program. The cooking program developer tool may create a copy of the parent cooking program creation form and the user may change one or more inputs of the creation form to create the child cooking program. In some examples, the cooking program developer tool automatically modifies one or more inputs of the of the copy of the parent cooking program creation form based on the user's inputs. The child cooking programs may be configured to result in a different finished outcome of the food item, utilize a different cooking appliance, and/or result in a faster or slower cooking time than the parent cooking program.

Step 704 of method 700 includes the internal user testing the new parent and/or the associated child cooking programs using one or more cooking appliances. In some examples, the cooking program developer tool receives a request from the internal user to execute the cooking programs and the cooking program developer tool communicates the cooking programs including instructions corresponding to the parent and associated child cooking programs to the one or more cooking appliances to be executed. The internal user may perform the necessary user actions specified in the cooking program instructions and the cooking appliance is configured to automatically execute the instructions of the cooking program sent by the cooking program developer tool.

Step 706 of method 700 includes the internal user receiving and/or providing feedback regarding the performance of each of the parent and associated child cooking programs. In some examples, after termination of the cooking program, the cooking program feedback tool prompts the user to provide user feedback regarding the performance of the automated cooking program. The cooking program feedback tool may prompt the user to provide binary (e.g., positive/negative), scored value (e.g., points or star system), options of text choice or descriptions, and/or open field response feedback. In some examples, the cooking program feedback tool prompts the user to provide feedback by sending a message to a user's mobile device, and/or the user's cooking appliance. Feedback may also include sensor data collected by various sensors of the cooking appliance during the cooking process.

Step 708A of method 700 includes determining the received feedback for one or more of the parent and/or associated child cooking programs indicates that the program performed unsatisfactory. In some examples, feedback provided by the user, and/or the sensor data collected during the cooking process is automatically analyzed by the cooking program developer tool, and/or analyzed by the user to determine if the feedback indicates the program performed unsatisfactorily. Unsatisfactory performance of the cooking program may be determined based on feedback indicating an actual finished outcome of the food item did not match the expected finished outcome of the food item, the user instructions were not helpful, the cooking program took too long to complete, etc. In some examples, the received feedback includes a direct indication that the expected finished outcome did not match the actual finished outcome, such as a yes or no response to a question asking if the actual finished outcome matched the expected finished outcome for the cooking program. In some examples, the feedback includes a satisfaction level of the user with the performance of the cooking program. In some examples, the cooking program developer tool and/or the internal user infers from a user satisfaction level, written feedback, and/or the sensor data collected by the cooking appliance that the cooking program did not perform satisfactorily.

Step 708B of method 700 includes receiving feedback indicating the parent and associated child cooking programs performed satisfactorily. The cooking program developer tool and/or the internal user may analyze the received feedback and determine that each of the cooking programs performed satisfactorily. Feedback indicating satisfactory performance may include a user satisfaction level, a user rating of the cooking program, and/or a written description of the cooking program performance.

Step 710A of method 700 includes modifying one or more inputs of the parent or associated child cooking program in response to receiving the feedback indicating the program performed unsatisfactorily. In some examples, the internal user modifies the one or more inputs of the parent or associated child cooking programs based on the received feedback. In some examples, the cooking program developer tool automatically modifies the one or more inputs of the parent or associated child cooking programs. The cooking program developer tool and/or the internal user may modify the cooking parameters (e.g., cooking duration, cooking temperature, cooking mode, cooking steps, etc.), the cooking appliance, trigger events, user instructions, and/or time alerts of the program.

In some examples, the received feedback indicates a particular part of the cooking program that performed unsatisfactorily, such as the user instructions, the time alerts, and/or the cooking parameters. In some examples, the feedback may indicate the actual finished result of the food item cooked using the cooking program did not match the expected finished result. The user and/or the cooking program developer tool may use this received feedback to determine which part of the cooking program to modify and the correct modifications to make. For example, if the feedback indicates the user instructions were not helpful but that the food item was cooked satisfactorily, the user and/or the developer tool may only modify the user instructions and not modify the cooking parameters of the cooking program. In another example, if the feedback indicates the actual finished outcome of the food item did not match the expected finished outcome of the food item, the user and/or the developer tool may modify one or more of the cooking parameters of the cooking program.

In some examples, after modifying the one or more inputs of the parent and/or associated child cooking programs the internal user and/or the cooking program developer tool repeat steps 704 to 710 of method 700 again. The internal user and/or the cooking program developer tool may repeatedly test the cooking program, analyze the feedback, and modify the cooking programs until the feedback indicates satisfactory performance of each of the cooking programs in the family. In some examples, the internal user and/or the developer tool repeat steps 704 to 710 with only the specific cooking programs receiving the feedback indicating unsatisfactory performance.

Step 710B of method 700 includes sharing the parent and associated child cooking programs in the cooking program marketplace. In response to the received feedback indicating satisfactory performance of each of the cooking programs, the internal user may share the cooking programs in the cooking program marketplace. Sharing the cooking programs in the cooking program marketplace allows a plurality of end users to view and utilize the cooking programs.

Step 712A of method 700 includes modifying the parent and/or other associated child cooking programs based on the modification of the unsatisfactory cooking program in step 710A of method 700. In some examples, if one or more of the cooking programs in the cooking program family perform unsatisfactorily, it may be inferred that other programs in the cooking program family may also perform unsatisfactorily. For example, if a parent cooking program receives feedback indicating the program overcooked the food item, the child cooking programs based on the parent cooking program may also overcook the food item. In some examples, the cooking program developer tool prompts the internal user to modify the other cooking programs in the cooking program family in response to the user modifying one of the programs. In some examples, the cooking program developer tool is configured to automatically update the other associated cooking programs based on the modification of the cooking program in step 710A of method 700. For example, if the modification in step 710A of the method includes reducing the cooking time of the parent cooking program, the developer tool may automatically reduce the cooking time of the other associated cooking programs. Modifying the other associated cooking programs based on the modification of one of the cooking programs in the cooking program family facilitates the improvement of each cooking program in the family, without necessarily needing to test each program individually.

Step 712B of method 700 includes the end user(s) selecting and executing one or more of the cooking programs in the cooking program family. The end user(s) may select the cooking program in the cooking program marketplace and execute the cooking program using the end user's cooking appliance. In some examples, the end user may modify one or more inputs of the cooking program according to the end user's preferences.

Step 714 of method 700 includes the end user providing feedback regarding the performance of the cooking program. The cooking program feedback tool may prompt the user to provide feedback regarding the performance of the cooking program. In some examples, the user feedback is sent to the internal user to be reviewed and analyzed and steps 706-714 of method 700 repeat. In some examples, the steps 706-714 of method 700 only repeat in response to the cooking program being executed a specific number of times and the internal user receiving a specific amount of feedback regarding the performance of the program. In addition to the internal user being able to review the feedback and modify the cooking programs, the end user may also have the option to modify the cooking program according to the end user's personal preferences. The end user may then share the modified version of the cooking program in the cooking program marketplace, and/or decide not to share the cooking program and only use the cooking program themselves.

H. Illustrative Method of Using Cooking Program Marketplace

Figure 15:
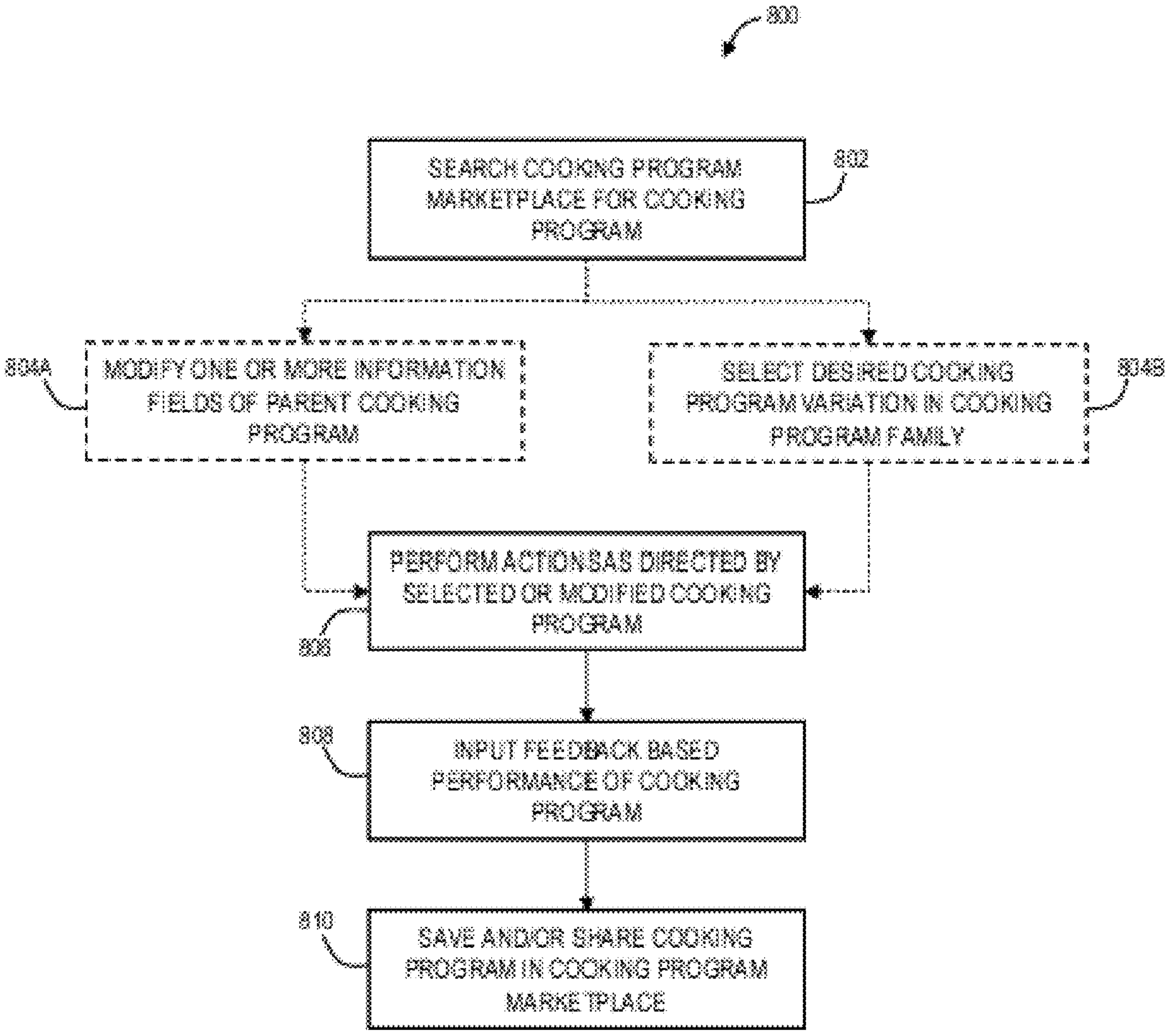
FIG. 15 is an illustrative flow chart depicting steps of an illustrative method for utilizing a cooking program marketplace in accordance with aspects of the present disclosure.

This section describes steps of an illustrative method 800 for using a cooking program marketplace to find and create cooking programs to cook a food item or meal; see FIG. 15. Aspects of cooking program development systems 100 and/or 200 may be utilized in the method steps described below. Where appropriate, reference may be made to components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. Although various steps of method 800 are described below and depicted in FIG. 14, the steps need not necessarily all be performed, and in some cases may be performed simultaneously or in a different order than the order shown.

Step 802 of method 800 includes searching the cooking program marketplace for a cooking program. The cooking program marketplace may include cooking programs created by both internal and end users using the cooking program developer tools, described above. The cooking program marketplace provides both internal and end users access to many different cooking programs for different cooking appliances and different food items. After searching the cooking program marketplace to find a cooking program the user may select a specific cooking program to view more information about the program, to modify the program, and/or to execute the cooking program to cook a food item. Saved with each cooking program in the cooking program marketplace is the cooking program creation form of the cooking program and any user feedback regarding the performance of the program gathered by the cooking program feedback tool. The user may view the information of the program creation form and the feedback to determine if the user wishes to use a specific cooking program. In some examples, the user accesses the cooking program marketplace via an application on a user's mobile device, and/or via an application stored on the user's cooking appliance.

Step 804A of method 800 includes modifying one or more variables of the cooking program selected in step 802 of method 800. After selecting the specific cooking program, the user has the option to modify one or more variables of the cooking program based on the user's preferences, and/or based on the cooking appliances available to the user. The user may choose to modify one or more information fields of the cooking program creation form for the cooking program. For example, the user may find and select a cooking program in the cooking program marketplace that is for cooking chicken using a regular oven, but the user desires to cook chicken using a convection oven. The user may modify the cooking appliance type and one or more cooking parameters in the program creation form to account for the user's different cooking appliance. In some examples, the cooking program developer tool is configured to automatically determine one or more modifications of the selected cooking program.

Step 804B of method 800 includes selecting a desired variation of the cooking program selected in step 802 of method 800. In some examples, the selected cooking program is part of a cooking program family. The cooking program family may include a parent cooking program and one or more child cooking programs created based on the parent cooking program. Each of the parent and child cooking programs are configured to cook the same food item but may have one or more differences than each other. In some examples, each of the parent and child cooking programs are configured to cook the food item to have a different finished outcome of the food item (e.g., chewy, normal, crunchy, etc.). The user is able to view each of the programs in the cooking program family and choose the variation of the cooking program based on the user's preferences.

Step 806 of method 800 includes performing actions as directed by the selected or modified cooking program of step 804A or 804B. After the user modifies the cooking program or chooses a variation of the cooking program in the cooking program family, the cooking program developer tool is configured to generate instructions according to the inputs of the program creation form and communicate the instructions to a cooking appliance to cook a food item. Included in the instructions for the cooking appliance are user instructions for actions to be performed by the user to perform the cooking program. Actions for the user to perform may include preparing food items (e.g., cutting, blending, mixing, seasoning, etc.), placing the food items in the cooking appliance, moving the food item during the cooking process, and/or removing the food item after the cooking process has completed. The user instructions may be displayed on a user interface of the user's mobile device, and/or a user interface of the user's cooking appliance.

Step 808 of method 800 includes inputting feedback based on the performance of the cooking program. After the cooking process has completed the user may be prompted to provide feedback regarding the performance of the cooking program. The cooking program feedback tool may prompt the user to provide binary (e.g., positive/negative), scored value (e.g., points or star system), options of text choice or descriptions, and/or open field response feedback. The user may input the feedback via a user interface of the user's mobile device, and/or a user interface of the cooking appliance.

Step 810 of method 800 includes saving and/or sharing the cooking program in the cooking program marketplace. If the user created a new variation of the selected cooking program in step 804A by modifying the existing program, the user may choose to save and/or share the modified version of the cooking program in the cooking program marketplace. The user could then reuse the modified version again in the future. If the program is shared other users of the cooking program marketplace would have access to the program to use and modify according to their preferences. In some examples, the user feedback provided in step 808 of method 800 is saved with the modified cooking program creation form to provide other users an indication of the performance of the program.

I. Illustrative Machine Learning Algorithm

Figure 16:
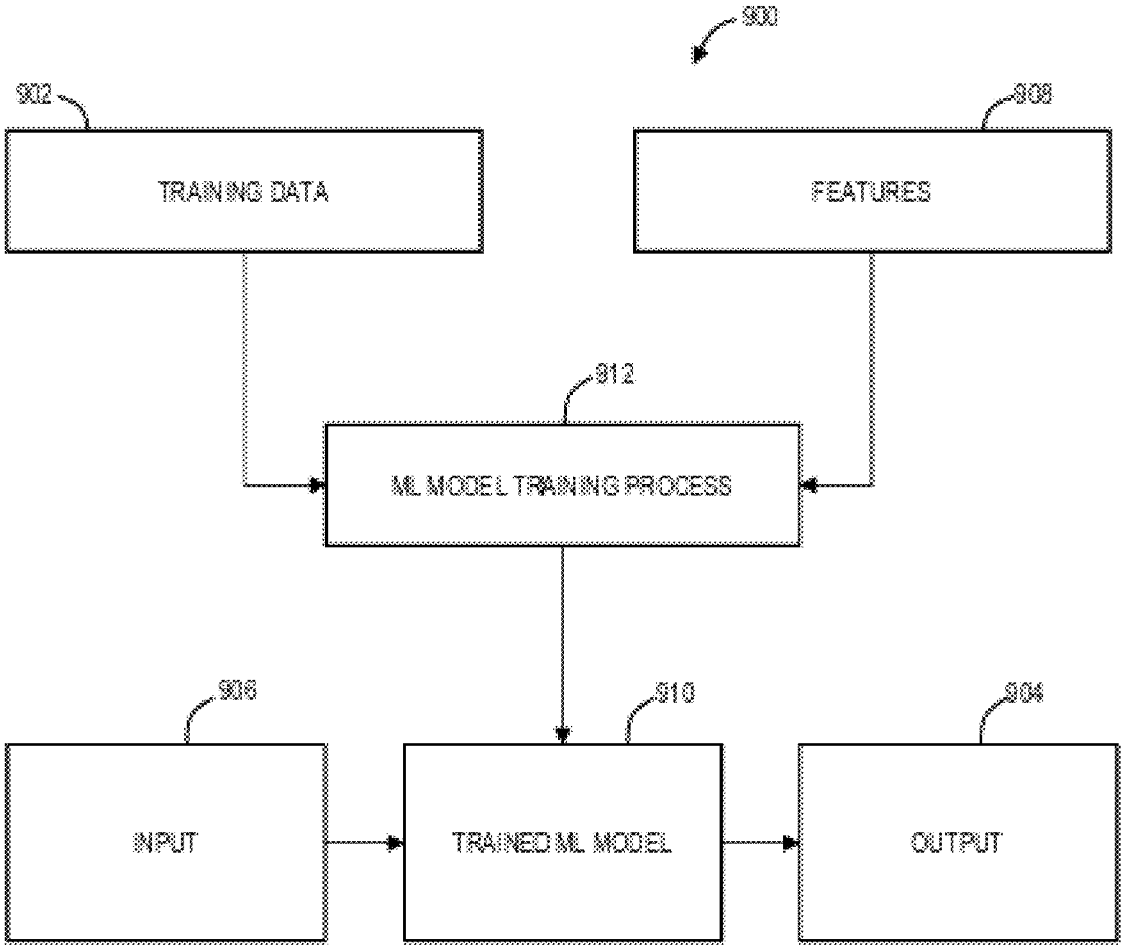
FIG. 16 is a schematic diagram of an illustrative machine learning model in accordance with aspects of the present disclosure.

As shown in FIG. 16, this section describes the training or use of an illustrative machine learning algorithm or model 900 suitable for use with cooking program development systems of the present disclosure.

In general, machine learning (ML) models (AKA ML algorithms, ML tools, or ML programs) may be utilized to generate estimates, predictions, or decisions that are useful in themselves and/or in the service of a more comprehensive program. ML algorithms "learn" by examples, based on existing sample data, and generate a trained model. Using the trained model, predictions or decisions can then be made regarding new data without explicit programming. Machine learning therefore involves algorithms or tools that learn from existing data and make predictions about novel data.

Training data 902 (e.g., labeled training data) is utilized to build trained ML model 100, such that the ML model can produce a desired output 904 when presented with new data 906. In general, the ML model uses labeled training data 902, which includes values for the input variables and values for the known correct outputs, to ascertain relationships and correlations between variable or features 908 to produce and algorithm mapping the input values to the outputs.

Supervised learning methods may be utilized for the purposes of producing classification or regression algorithms. Classification algorithms are typically used in situations where the goal is categorization (e.g., whether a photo contains a cat or a dog). Regression algorithms are typically used in situations where the goal is a numerical value (e.g., the market value of a house).

Features 908 may include any suitable characteristics capable of being measured and configured to provide some level of information regarding the input scenario, situation, or phenomenon. For example, if the goal is to provide an output relating to the market value of a house, then the features may include variables such as square footage, postal code, year built, lot size, number of bedrooms, etc. Although these example features are numeric, other feature types may be included, such as strings, Boolean values, etc.

Different ML techniques may be used, depending on the application. For example, artificial neural networks, decision trees, support-vector machines, regression analysis, Bayesian networks, genetic algorithms, random forests, and/or the like may be utilized to produce the trained ML model.

Trained ML model 910 is produced by training process 912 based on identified features 908 and training data 902. Trained ML model 910 can then be utilized to predict a category or decide an output value 904 based on new data 906.

With respect to the present disclosure, one or more ML models may be trained and used to determine one or more input values of a cooking program creation form for a cooking program. Training data for one or more of the ML models may include the cooking program creation forms of many existing cooking programs for many different types of food items and different cooking appliances, such that the ML model is trained to determine typical cooking parameters and cooking appliances used to cook different types of food items. For example, one or more trained ML models may receive as input a food item type for a new cooking program and output a recommended cooking appliance to use and a recommended set of cooking parameters to cook the food item using the cooking appliance.

In some examples, one or more ML models may be trained and used to determine modifications to make to a cooking program based on user feedback regarding the performance of the cooking program and/or based on sensor data collected during execution of the cooking program by sensors of a cooking appliance. For example, a user may input feedback indicating the cooking program overcooked a food item and the trained ML model may output one or more modifications to cooking parameters of the cooking program based on the received feedback. In another example, sensor data collected by the cooking appliance during the cooking process may indicate the cooking program resulted in the food item being cooked to have a greater brownness level than expected for the cooking program. Using this sensor data as input the trained ML model may output a modification to one or more cooking parameters of the cooking program, such as reducing cooking time or cooking temperature. Training data for the one or more ML models may include user feedback and/or sensor data from a cooking appliance regarding a cooking program and corresponding modifications made to the cooking program to improve the cooking program based on the feedback.

J. Illustrative Combinations and Additional Examples

Systems of the present disclosure may be configured to provide one or more of the following features:

- Automatically adjust cooking time based on sensed characteristics of the food item.
- Automatically generate cooking parameters for a cooking program based on user input.
- Automatically modify child cooking programs of a parent cooking program in response to the parent cooking program being modified.
- Automatically modify an existing cooking program to accommodate new parameters such as faster cooking speed, using a different cooking appliance, different quantity of food, etc.
- Automatically request feedback in response to termination of cooking program by cooking appliance.
- Automatically adjust cooking parameters based on user feedback.
- Use sensor data as feedback to automatically update one or more cooking parameters of the cooking program.
- Automatically transitioning between different cooking steps of the cooking program in response to detecting a trigger event.
- Automatically generating a cooking program creation form based on a cooking appliance type and food item type.

The following describes aspects and features of a cooking program development system of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A computer-implemented method for developing automatic cooking programs associated with one or more cooking appliances, the method comprising:

receiving, at an electronic device of a user, a selection of a cooking appliance type from a plurality of possible cooking appliance types and a selection of a food item type from a plurality of possible food item types;

automatically generating, based on the received selections, a cooking program creation form including a plurality of information fields, wherein each information field is configured to receive a specific type of information relating to an automatic cooking program configured to be executed by a cooking appliance of the selected cooking appliance type to cook a food item of the selected food item type;

displaying, on a user interface of the electronic device, the cooking program creation form including the plurality of information fields;

receiving information in one or more of the information fields of the cooking program creation form to create the automatic cooking program;

communicating the automatic cooking program to the cooking appliance to be automatically executed by the cooking appliance to cook the food item; and storing the automatic cooking program in a memory of the electronic device.

A1. The method of A0, further comprising receiving feedback regarding a performance of the automatic cooking program and automatically modifying one or more information fields of the automatic cooking program based on the feedback.

A2. The method of A1, wherein the automatic cooking program is configured to result in a food item cooked according to an expected finished outcome, and the feedback includes a comparison of the expected finished outcome with an actual finished outcome of the food item cooked using the cooking program.

A3. The method of anyone of paragraphs A0 to A2, wherein the automatic cooking program includes instructions for the cooking appliance to automatically determine one or more cooking parameters to utilize to cook the food item based on sensed characteristics of the food item.

A4. The method of anyone of paragraphs A0 to A3, wherein automatically determining the information fields includes determining options in a drop-down menu of the cooking program creation form, wherein the options are based on possible finished outcomes associated with the selected food item category.

A5. The method of anyone of paragraphs A0 to A4, wherein automatically determining the information fields includes determining options in a drop-down menu of the cooking program creation form, wherein the options are determined based on available cooking modes of the selected cooking appliance.

A6. The method of anyone of paragraphs A0 to A5, further comprising creating a second automatic cooking program based on the first automatic cooking program, wherein creating the second automatic cooking program includes:

receiving a user modification of the information in one or more information fields of the cooking program creation form;

automatically modifying one or more other information fields of the cooking program creation form based on the user modifications; and storing the modified cooking program as a new second cooking program associated with the first cooking program card.

A7. The method of anyone of paragraphs A0 to A6, further comprising automatically providing information in one or more information fields of the cooking program creation form based on the cooking appliance type and food item type.

A8. The method of anyone of paragraphs A0 to A7, wherein the automatic cooking program includes instructions configured to be automatically executed by the cooking appliance to cook the food item, and instructions for a user of the cooking appliance to direct the user to prepare the food item to be cooked.

A9. The method of anyone of paragraphs A0 to A8, wherein the automatic cooking program includes multiple cooking steps, and each cooking step includes a cooking mode and a cooking temperature.

A10. The method of A9, wherein the automatic cooking program includes instructions for the cooking appliance to automatically transition between the different cooking steps of the cooking program in response to detecting a trigger event.

A11. The method of A10, wherein detecting the trigger event includes detecting an internal temperature of the food item reaching a threshold level.

B0. A system for developing automated cooking programs, the system comprising:

a personal electronic device in communication with a cooking appliance, the personal electronic device including a first user interface and processing logic configured to:

automatically generate, based on a type of the cooking appliance, a cooking program creation form including a plurality of information fields, wherein each information field is configured to receive a specific type of information relating to an automatic cooking program configured to be executed by a cooking appliance of the selected cooking appliance type to cook a food item of a selected food item type;

display, on the first user interface of the electronic device, the cooking program creation form including the plurality of information fields;

receive information in one or more of the information fields of the cooking program creation form to create the automatic cooking program; and communicate the automatic cooking program to the cooking appliance to be automatically executed to cook the food item; and the cooking appliance in communication with the personal electronic device, wherein the cooking appliance includes a sensor, a second user interface, and an electronic controller including processing logic configured to automatically execute the instructions of the automatic cooking program to cook the food item.

B1. The system of B0, wherein automatically executing the automatic cooking program includes utilizing the sensor to detect a characteristic of the food item and automatically determining one or more cooking parameters of the cooking program based on the detected characteristic of the food item.

B2. The system of anyone of paragraphs B0 to B1, wherein automatically executing the automatic cooking program includes transitioning between multiple steps of the cooking program.

B3. The system of paragraph B2, wherein transitioning between the multiple steps of the cooking program includes changing a cooking mode of the appliance.

B4. The system of paragraph B2 or B3, wherein transitioning between the multiple steps of the cooking program includes changing a cooking temperature of the cooking appliance.

B5. The system of paragraph anyone of paragraphs B0 to B4, wherein the processing logic of the cooking appliance is further configured communicate, to the personal electronic device, a notification of a completion of executing the cooking program.

B6. The system of paragraph B5, wherein the processing logic of the personal electronic device is further configured to automatically prompt the user to provide feedback regarding the performance of the automatic cooking program.

B7. The system of paragraph B6, wherein prompting the user to provide the feedback includes displaying a notification on the first user interface.

C0. A computer-implemented method for creating a new automatic cooking program based on a pre-existing automatic cooking program, the method comprising:

receiving, at an electronic device of a user, a user modification of one or more variables of a plurality of variables of a base automatic cooking program, wherein the plurality of variables include one or more variables relating to a food item to be cooked, a cooking appliance to cook the food item, and user preferences, wherein the base automatic cooking program includes a first set of operating parameters associated with the plurality of variables and configured to be utilized by the cooking appliance to cook the food item according to the user preferences;

automatically generating a second set of operating parameters based on the first set of operating parameters and the user modification of the one or more variables, wherein the second set of operating parameters is associated with the modified plurality of variables;

generating a new automatic cooking program including the user modified plurality of variables and the automatically generated second set of operating parameters; and storing, in a memory of the electronic device, the new automatic cooking program as an associated child cooking program of the base automatic cooking program.

C1. The computer-implemented method of C0, wherein the plurality of variables of the base automatic cooking program includes one or more of a food item type, a food item quantity, a cookware type, a cookware size, a preferred interior doneness level of the food item, a preferred exterior brownness level of the food item, a cooking appliance type, and a capability of the cooking appliance.

C2. The computer-implemented method of C0 or C1, wherein the first set of operating parameters of the base automatic cooking program includes one or more of a cooking mode, a cooking temperature, a cooking duration, and steps in a cooking process.

Advantages, Features, and Benefits

The different embodiments and examples of the cooking program development system described herein provide several advantages over known solutions for creating and developing automatic cooking programs for cooking appliances. For example, illustrative embodiments and examples described herein allow for the easy creation and improvement of complex automated cooking programs for a variety of different food items and a variety of different finished outcomes of the different food items.

Additionally, and among other benefits, illustrative embodiments and examples described herein allow a cooking program developer tool to facilitate the easy creation and modification of the complex automated cooking programs. The cooking program developer includes automatic features to automatically determine certain variables of the cooking program and automatically generate an interactive cooking program creation form configured to guide a user in creating an automated cooking program for the user's specific cooking appliance.

Additionally, and among other benefits, illustrative embodiments and examples described herein allow a cooking program feedback tool to facilitate the use of user feedback to modify cooking programs to improve the performance of the cooking program.

Additionally, and among other benefits, illustrative embodiments and examples described herein allow for the creation of cooking programs configured to utilize sensed characteristics of a food item to automatically determine one or more cooking parameters of the cooking program. By utilizing sensed characteristics of the food item to determine cooking parameters, the cooking program is able to automatically adapt to the specific food item being cooked each time the program is executed.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for developing automatic cooking programs, the method comprising:

displaying, on a user interface (UI) of an electronic device, a cooking program creation form including a plurality of information fields, each information field configured to receive information relating to a specific variable of a new automatic cooking program to be created, wherein the plurality of information fields include one or more text-based information fields configured to receive text-based information and one or more drop-down menus including one or more user-selectable options;

receiving, in the cooking program creation form via the UI, a selection of a cooking appliance and a food item type for the new automatic cooking program;

automatically providing information in a first one or more of the information fields of the cooking program creation form, based on the selected cooking appliance and the selected food item type;

receiving, via the UI, user-provided information in a second one or more of the information fields of the cooking program creation form;

creating the new automatic cooking program based on the automatically provided information in the first one or more of the information fields and the user-provided information in the second one or more of the information fields of the cooking program creation form;

communicating the new automatic cooking program to the cooking appliance, wherein the cooking appliance is configured to automatically execute the new automatic cooking program to cook a food item of the food item type; and storing the new automatic cooking program in a memory of the electronic device.

2. The method of claim 1, further comprising receiving feedback at the electronic device regarding a performance of the new automatic cooking program and using a machine learning model trained to automatically output a modification of one or more of the information fields of the new automatic cooking program based on the feedback.

3. The method of claim 2, wherein the new automatic cooking program is configured to cook the food item according to an expected finished outcome, and the feedback includes a comparison of the expected finished outcome with an actual finished outcome of the food item after being cooked using the new automatic cooking program.

4. The method of claim 1, wherein the new automatic cooking program includes instructions to the cooking appliance to automatically determine one or more cooking parameters to cook the food item based on sensed characteristics of the food item.

5. The method of claim 1, wherein automatically providing information in the first one or more of the information fields includes automatically populating a first drop-down menu of the cooking program creation form with one or more user-selectable options automatically determined based on possible finished outcomes associated with the selected food item type.

6. The method of claim 1, wherein automatically providing information in the first one or more of the information fields includes automatically populating a first drop-down menu of the cooking program creation form with one or more user-selectable options automatically determined based on available cooking modes of the selected cooking appliance.

7. The method of claim 1, further comprising creating a second automatic cooking program based on the new automatic cooking program, wherein creating the second automatic cooking program includes:

receiving a user modification of the information in one of the information fields of the cooking program creation form;

using a machine learning model trained to automatically output a modification of another one of the information fields of the cooking program creation form based on the user modification; and storing the second automatic cooking program as an associated child cooking program of the new automatic cooking program.

8. The method of claim 1, wherein the new automatic cooking program includes first instructions configured to be automatically executed by the cooking appliance to cook the food item, and second instructions directing to a user.

9. The method of claim 1, wherein the new automatic cooking program includes multiple cooking steps, and each cooking step includes a cooking mode and a cooking temperature.

10. The method of claim 9, wherein the new automatic cooking program includes instructions for the cooking appliance to automatically transition between the multiple cooking steps of the new automatic cooking program in response to detecting a trigger event.

11. The method of claim 10, wherein detecting the trigger event includes detecting an internal temperature of the food item reaching a threshold level.

12. A system for developing automated cooking programs, the system comprising:

a personal electronic device in communication with a cooking appliance, the personal electronic device including a first user interface (UI) and first processing logic configured to:

display, on the first UI, a cooking program creation form including a plurality of information fields, each information field configured to receive information relating to a specific variable of an automatic cooking program to be created, wherein the plurality of information fields include one or more text-based information fields configured to receive text-based information and one or more drop-down menus including one or more user-selectable options, and wherein the automatic cooking program is configured to be executed by the cooking appliance to cook a food item of a selected food item type;

receive, via the first UI, first information in a first one or more of the information fields of the cooking program creation form;

automatically populate a second one or more of the information fields with second information based on one or more of the first information, a capability of the cooking appliance, and the selected food item type;

create the automatic cooking program based on the first information and the second information, wherein the automatic cooking program comprises a set of instructions; and communicate the automatic cooking program to the cooking appliance;

wherein the cooking appliance includes a sensor, a second UI, and an electronic controller including second processing logic configured to automatically execute the set of instructions of the automatic cooking program to cook the food item.

13. The system of claim 12, wherein automatically executing the automatic cooking program using the second processing logic includes utilizing the sensor to detect a characteristic of the food item and automatically determining one or more cooking parameters of the automatic cooking program based on the detected characteristic of the food item.

14. The system of claim 12, wherein automatically executing the automatic cooking program using the second processing logic includes transitioning between multiple steps of the automatic cooking program.

15. The system of claim 14, wherein the second processing logic is configured to transition between two of the multiple steps of the automatic cooking program by detecting a trigger event.

16. The system of claim 12, wherein the second processing logic of the cooking appliance is further configured to communicate, to the personal electronic device, a notification of a completion of executing the automatic cooking program.

17. The system of claim 16, wherein the first processing logic of the personal electronic device is further configured to automatically prompt a user to provide feedback regarding a performance of the automatic cooking program.

18. A method for creating a new automatic cooking program based on a pre-existing automatic cooking program, the method comprising:

displaying, on a user interface (UI) of an electronic device, a cooking program creation form of the pre-existing automatic cooking program, wherein the cooking program creation form includes a plurality of information fields, each information field storing pre-set information relating to a specific variable of a plurality of variables of the pre-existing automatic cooking program, wherein the plurality of information fields include one or more text-based information fields configured to receive and store text-based information and one or more drop-down menus including one or more user-selectable options, and wherein the pre-existing automatic cooking program includes a first set of operating parameters associated with the pre-set information stored in the plurality of information fields and configured to be utilized by a cooking appliance to cook a food item;

receiving, via the UI, a user modification of first pre-set information stored in a first one or more of the information fields;

automatically modifying second pre-set information stored in a second one or more of the information fields based on the user modification of the first pre-set information;

automatically generating a second set of operating parameters based on the first set of operating parameters, the user modification of the first pre-set information, and the automatically modified second pre-set information;

generating the new automatic cooking program including the automatically generated second set of operating parameters; and storing, in a memory of the electronic device, the new automatic cooking program as an associated child cooking program of the pre-existing automatic cooking program.

19. The method of claim 18, wherein the plurality of variables of the pre-existing automatic cooking program includes one or more of a food item type, a food item quantity, a cookware type, a cookware size, a preferred interior doneness level of the food item, a preferred exterior brownness level of the food item, a cooking appliance, and a capability of the cooking appliance.

20. The method of claim 18, wherein the first set of operating parameters of the pre-existing automatic cooking program includes one or more of a cooking mode, a cooking temperature, a cooking duration, and steps in a cooking process.

* * * * *